United States Patent
Hahn et al.

(10) Patent No.: US 12,070,970 B2
(45) Date of Patent: Aug. 27, 2024

(54) DECORATIVE FILM, TRANSFER FILM, USE OF A TRANSFER FILM, METHOD FOR PRODUCING A TRANSFER FILM, METHOD FOR DECORATING A PLASTIC MOLDED ARTICLE, AND PLASTIC MOLDED ARTICLE

(71) Applicant: LEONHARD KURZ Stiftung & Co. KG, Fürth (DE)

(72) Inventors: Martin Hahn, Herrieden (DE); Steven Hirschberg, Fürth (DE); Mustafa Kiyanat, Nuremberg (DE); Christiane Krauss, Neunkirchen am Sand (DE); Rainer Sigritz, Nuremberg (DE)

(73) Assignee: LEONHARD KURZ Stiftung & Co. KG, Fürth (DE)

( * ) Notice: Subject to any disclaimer, the term of this patent is extended or adjusted under 35 U.S.C. 154(b) by 80 days.

(21) Appl. No.: 17/278,957

(22) PCT Filed: Sep. 16, 2019

(86) PCT No.: PCT/EP2019/074724
§ 371 (c)(1),
(2) Date: Mar. 23, 2021

(87) PCT Pub. No.: WO2020/064404
PCT Pub. Date: Apr. 2, 2020

(65) Prior Publication Data
US 2022/0048315 A1    Feb. 17, 2022

(30) Foreign Application Priority Data
Sep. 24, 2018 (DE) .......................... 102018123473.2

(51) Int. Cl.
B32B 7/12     (2006.01)
B44C 1/17    (2006.01)
(Continued)

(52) U.S. Cl.
CPC ............ *B44C 1/1704* (2013.01); *B44C 3/005* (2013.01); *B29C 45/1679* (2013.01); *B32B 7/12* (2013.01);
(Continued)

(58) Field of Classification Search
CPC ..... B44C 1/1704; B44C 1/1729; B44C 3/005; B29C 45/1679; B32B 7/12; B32B 2457/208
See application file for complete search history.

(56) References Cited

U.S. PATENT DOCUMENTS 5,053,260 A    10/1991    Brehm
5,985,078 A    11/1999    Suess et al.
(Continued)

FOREIGN PATENT DOCUMENTS

CN    101115630 A    1/2008
DE    3926578 C1    7/1990
(Continued)

OTHER PUBLICATIONS

DE 4212423 EPO Machine Translation.*
(Continued)

*Primary Examiner* — Laura C Powers
(74) *Attorney, Agent, or Firm* — Hoffmann & Baron, LLP

(57) ABSTRACT

A decorative film, a transfer film, the use of a transfer film, a method for producing a transfer film, a method for decorating a plastic molded article, and a plastic molded article. The decorative film, in particular for decorating a plastic molded article, here includes at least one first color varnish layer, at least one second color varnish layer and a transparent laser protective varnish layer, wherein the transparent laser protective varnish layer is arranged between the at least one first color varnish layer and the at least one second color varnish layer.

14 Claims, 11 Drawing Sheets

(51) Int. Cl.
  *B44C 3/00* (2006.01)
  *B29C 45/16* (2006.01)

(52) U.S. Cl.
  CPC ....... *B32B 2457/208* (2013.01); *B44C 1/1729* (2013.01)

(56) References Cited

U.S. PATENT DOCUMENTS

| | | | |
|---|---|---|---|
| 8,158,252 | B2 | 4/2012 | Sussner et al. |
| 8,314,990 | B2 | 11/2012 | Suessner et al. |
| 2005/0032984 | A1* | 2/2005 | Choi ................ C08F 279/02 525/242 |
| 2005/0153110 | A1* | 7/2005 | Juby ................... B32B 27/10 428/195.1 |
| 2008/0213541 | A1 | 9/2008 | Schilling et al. |
| 2009/0022966 | A1 | 1/2009 | Lust et al. |
| 2016/0318222 | A1* | 11/2016 | Deckert ............ B29C 45/14467 |
| 2017/0066168 | A1 | 3/2017 | Ludwig et al. |
| 2017/0368864 | A1 | 12/2017 | Walter et al. |
| 2018/0021995 | A1 | 1/2018 | Schulz et al. |
| 2018/0154678 | A1 | 6/2018 | Olszowka et al. |
| 2018/0348900 | A1 | 12/2018 | Heinrich et al. |
| 2018/0370096 | A1 | 12/2018 | Fuchs et al. |
| 2019/0375139 | A1 | 12/2019 | Deckert et al. |
| 2020/0215846 | A1 | 7/2020 | Ordung et al. |

FOREIGN PATENT DOCUMENTS

| | | |
|---|---|---|
| DE | 3925665 C2 | 2/1991 |
| DE | 413427 C1 | 12/1992 |
| DE | 4134271 | 12/1992 |
| DE | 4212423 A1 | 10/1993 |
| DE | 10222477 A1 | 10/2004 |
| DE | 102004017093 A1 | 11/2005 |
| DE | 102006005089 A1 | 8/2007 |
| DE | 102008036670 B3 | 11/2009 |
| DE | 102013013598 A1 | 2/2015 |
| DE | 102013114276 A1 | 6/2015 |
| DE | 102014106585 A1 | 11/2015 |
| DE | 102015100208 A1 | 7/2016 |
| DE | 102015100520 A1 | 7/2016 |
| DE | 102015106800 A1 | 11/2016 |
| DE | 102015109642 A1 | 12/2016 |
| DE | 102015109597 A1 | 1/2017 |
| DE | 102015121195 A1 | 6/2017 |
| DE | 102017118579 A1 | 2/2019 |
| DE | 102017216023 A1 | 3/2019 |
| EP | 0537668 A2 | 4/1993 |
| JP | H03116085 A | 5/1991 |
| JP | 3727672 B2 * | 12/2005 |
| JP | 2010-052277 A | 3/2010 |
| JP | 2014-112273 A | 6/2014 |
| WO | 2015/091383 A1 | 6/2015 |

OTHER PUBLICATIONS

EPO Machine Translation of Depcik et al. DE 4212423A1.*
Machine Translation of JP 3727672 (aka JPH085808).*
"Light Transmittance" ; http://performativedesign.com/definitions/light/transmittance/#:~:text=Light%20transmittance%20is%20a%20property,light%20at%20all%20gets%20through; Nov. 9, 2010 (Year: 2010).*
Japanese Office Action dated Jul. 18, 2023.

\* cited by examiner ature. Such decorative elements can have both a technical function, for example as a light passage for backlighting with electroluminescent elements, LEDs and/or OLEDs, and also can serve as a purely decorative element.

DECORATIVE FILM, TRANSFER FILM, USE OF A TRANSFER FILM, METHOD FOR PRODUCING A TRANSFER FILM, METHOD FOR DECORATING A PLASTIC MOLDED ARTICLE, AND PLASTIC MOLDED ARTICLE

This application claims priority based on an International Application filed under the Patent Cooperation Treaty, PCT/EP2019/074724, filed Sep. 16, 2019, which claims priority to DE 102018123473.2, filed Sep. 24, 2018.

BACKGROUND OF THE INVENTION

The invention relates to a decorative film, a transfer film, the use of a transfer film, a method for producing a transfer film, a method for decorating a plastic molded article, and a plastic molded article.

To decorate surfaces, decorative films are often used, which are applied to a plastic molded article for example by means of in-mold methods. High demands are made on the surfaces of plastic molded articles decorated in such a way.

On the one hand, these surfaces are to be resistant to mechanical, physical and chemical environmental influences occurring in daily use, for example due to fingerprints or substances found on the skin, such as sun creams. For this, the decorative films often have a protective varnish layer on their surface, which are to protect layers lying underneath correspondingly from the environmental influences. On the other hand, these surfaces are to be visually appealing and also to contain decorative elements, such as for example symbols or writing. Such decorative elements are usually generated on the decorative film using printing technology. However, this results in a few disadvantages. Thus, both the positioning and the resolution of the decorative elements are limited by the printing method used. If in particular plastic molded articles decorated with individualized decorative films or correspondingly decorated plastic molded articles are to be produced in small quantities, this is associated with a large amount of time required and logistical effort, and thus also with high costs, as the printing tools, such as for example printing plates, have to be provided and set up correspondingly for each individual decorative film. Alternatively, decorative elements, such as for example symbols or writing, can also be generated in the decorative film by means of laser engraving, wherein a protective varnish layer arranged on the surface of the decorative film is, however, also destroyed during the engraving, with the result that at least locally either the resistance to environmental influences is reduced or the surface of the decorated plastic molded article has to be provided with a further protective varnish layer, which is in particular associated with further costs.

Thus, EP 0 537 668 A2 discloses a process for decorating or marking a surface by means of laser radiation and the use of a stamping foil in this process.

SUMMARY OF THE INVENTION

The object of the invention is now to provide an improved decorative film, and an improved method for decorating a plastic molded article.

This object is achieved by a decorative film, in particular for decorating a plastic molded article, comprising at least one first color varnish layer, at least one second color varnish layer and a transparent laser protective varnish layer, wherein the transparent laser protective varnish layer is arranged between the at least one first color varnish layer and the at least one second color varnish layer. This object is further achieved by a transfer film, in particular a hot-stamping film and/or in-mold film, comprising a carrier film and a decorative film detachable from the carrier film. This object is further achieved by the use of a transfer film as a hot-stamping film and/or in-mold film, in particular as an in-mold decoration film, insert-molding film, in-mold labeling film and/or print mold design film. This object is also achieved by a method for producing a transfer film comprising a carrier film and a decorative film detachable from the carrier film, in particular according to one of claims 1 to 53, comprising at least one first color varnish layer, at least one second color varnish layer and a transparent laser protective varnish layer, wherein the method comprises the following steps, which are in particular implemented in the following order: a) providing the carrier film; b) applying the at least one first color varnish layer, in particular by means of printing methods and/or metallization methods; c) applying the transparent laser protective varnish layer, in particular by means of printing methods; d) applying the at least one second color varnish layer, in particular by means of printing methods, metallization methods and/or hot- or cold-transfer methods. This object is further also achieved by a method for decorating a plastic molded article comprising the following steps, which are in particular implemented in the following order: a) providing a decorative film wherein the decorative film comprises at least one first color varnish layer, at least one second color varnish layer and a transparent laser protective varnish layer, wherein the transparent laser protective varnish layer is arranged between the at least one first color varnish layer and the at least one second color varnish layer; b) applying the decorative film to the plastic molded article, preferably by means of hot- or cold-transfer methods, further preferably by means of hot stamping and/or in-mold methods; c) removing at least the first color varnish layer, in particular facing an observer, in one or more first areas by means of a laser. Furthermore, this object is also achieved by a plastic molded article comprising a decorative film wherein the decorative film comprises at least one first color varnish layer, at least one second color varnish layer and a transparent laser protective varnish layer, wherein the transparent laser protective varnish layer is arranged between the at least one first color varnish layer and the at least one second color varnish layer, wherein the at least one first color varnish layer, in particular facing an observer, is removed in one or more first areas by means of a laser.

It has been shown here that the resistance of the decorative film or the resistance of a plastic molded article decorated with the decorative film is increased by the decorative film according to the invention, by the transfer film, the use of the transfer film, the method for producing the transfer film, the method for decorating the plastic molded article, and the plastic molded article, wherein at the same time an ability to individualize the decorative film is guaranteed. Because the decorative film has a transparent laser protective varnish layer between the color varnish layers, it is made possible, even after removal of a color varnish layer and a protective varnish layer possibly arranged thereon, to protect the color varnish layer lying underneath from mechanical, physical and chemical environmental influences without the individualized plastic molded article having to be provided for example with a protective varnish layer again. The transparent laser protective varnish layer further also ensures that the color varnish layer to be removed can on the one hand be stripped off completely, i.e. in particular without residues, without the color varnish layer arranged underneath being damaged. The transparent laser protective varnish layer therefore performs a double function: firstly it protects the color varnish layer arranged underneath the transparent laser protective varnish layer from environmental influences and secondly it acts as a spacer or buffer layer for the stripping laser. This makes it possible to provide plastic molded articles with decorative elements, such as for example symbols or writing, individually, for example customized, at a later point in the production process, wherein it is ensured that the decorative film meets the required specifications with respect to resistance, without complex and lengthy follow-up processes, such as for example the application of a new protective varnish layer, being necessary. This further also makes larger tolerances in the focusing of the laser possible, whereby the production is further simplified.

By the terms underneath and/or above is meant here in particular the arrangement of layers in relation to another layer when viewed by an observer from an observation direction. Thus, it is expedient if the terms underneath and/or above represent a frame of reference. It is thus possible, for example, for the at least one second color varnish layer to be arranged underneath the transparent laser protective varnish layer in the observation direction.

It is therefore possible for the at least one first color varnish layer to be arranged on the side of the transparent laser protective varnish layer facing an observer and for the at least one second color varnish layer to be arranged on the side of the transparent laser protective varnish layer facing away from the observer. It is thus possible for the at least one first color varnish layer to form the side facing an observer. It is thus also possible for the at least one second color varnish layer to be arranged underneath the transparent laser protective varnish layer and/or underneath the at least first color varnish layer in the observation direction.

By a transparent laser protective varnish layer is preferably meant a transparent protective varnish layer, in particular a transparent intermediate protective varnish layer, which protects the at least one second color varnish layer, in particular the layers lying underneath this transparent intermediate protective varnish layer seen from an observer, from mechanical, physical and/or chemical environmental influences and/or is designed such that it further acts as a spacer or buffer layer for the stripping laser. It is thus possible for the transparent laser protective varnish layer to be a transparent protective varnish layer, in particular a transparent intermediate protective varnish layer.

By area is meant here in particular in each case a defined surface area of a layer or ply which is occupied when viewed perpendicular to a plane spanned by the decorative film, in particular by the at least one first color varnish layer, the transparent laser protective varnish layer and/or the at least one second color varnish layer. Thus, for example, the at least one first color varnish layer has one or more first areas, wherein each of the areas in each case occupies a defined surface area when viewed perpendicular to a plane spanned by the at least one first color varnish layer.

By removal of a layer is meant here the partial and/or complete removal of a layer, in particular by means of laser cutting and/or laser ablation. If, for example, a layer is removed in an area, the corresponding layer in this area has been partially and/or completely removed. The removal is preferably effected here on the basis of laser cutting and/or laser ablation. By removal is also meant the partial and/or complete removal of a layer, in particular by means of mechanical or precision methods, for example by means of milling and/or grinding and/or drilling.

By partially removed is preferably meant here that the partially removed layer is altered or destroyed such that it no longer satisfies its predetermined properties.

Thus, for example, a partially removed protective varnish layer no longer satisfies its predetermined property of protecting layers arranged underneath from chemical, physical and/or mechanical environmental influences.

By completely removed is preferably meant here that the completely removed layers are stripped off and/or ablated and/or burnt up and/or evaporated residue-free in the corresponding areas. Thus, if for example the at least one first color varnish layer is completely removed in the one or more first areas, in particular by means of laser cutting and/or laser ablation, then the at least one first color varnish layer is stripped off residue-free in the one or more first areas.

Further advantageous embodiments of the invention are described in the dependent claims.

It is further advantageous if the transparent laser protective varnish layer has a layer thickness of between 0.5 µm and 50 µm, preferably between 2.0 µm and 2.5 µm.

Preferably, the at least one first color varnish layer, in particular facing an observer, is removed, in particular completely removed, in one or more first areas, and/or the at least one first color varnish layer, in particular facing an observer, is removed in the one or more first areas such that the transparent laser protective varnish layer is uncovered. This makes it possible for the transparent laser protective varnish layer and, in particular, layers arranged underneath the transparent laser protective varnish layer in the observation direction to become visible to an observer, in particular to become visible when the decorative film is backlit by means of a backlighting means.

The one or more first areas advantageously form decorative elements, such as for example symbols or writing.

It is further expedient if the one or more first areas represent a logo and/or a symbol and/or a pattern and/or an alphanumeric character.

It is further also preferred if the one or more first areas, when viewed perpendicular to the decorative film, have a line width of at least 50 µm, preferably of at least 100 µm, and/or if the one or more first areas, when viewed perpendicular to the decorative film, have a line width of at most 2 mm, preferably of at most 1 mm, further preferably of at most 0.5 mm.

It is further also possible for the transparent laser protective varnish layer to be designed such that the layer thickness of the transparent laser protective varnish layer in the one or more first areas in which the at least one first color varnish layer is removed by means of a laser is reduced by less than 25%, preferably by less than 15%, further preferably by less than 5%, compared with those areas in which the at least one first color varnish layer is not removed by means of the laser.

It also makes sense if the layer thickness of the transparent laser protective varnish layer in one or more first areas in which the at least one first color varnish layer is removed by means of a laser substantially corresponds to the layer thickness of the transparent laser protective varnish layer in those areas in which the at least one first color varnish layer is not removed by means of the laser.

In particular, a possible slight superficial damage of the transparent laser protective varnish layer during the individualization is acceptable, preferably as long as the total thickness of the transparent laser protective varnish layer is reduced by no more than 50%, preferably by no more than 30%.

In particular, among other things, it is hereby ensured in the end product on the one hand that the transparent laser protective varnish layer performs its function of protection from environmental influences for the layers lying underneath and on the other hand that the transparent laser protective varnish layer also performs, or has also performed, its function as a spacer or buffer layer.

The transparent laser protective varnish layer preferably has, in particular in the wavelength range between 380 nm and 780 nm, a transmittance of at least 25%, preferably of at least 75%, further preferably of at least 85%. This makes it possible, among other things, for the layers arranged underneath the transparent laser protective varnish layer in the observation direction to be visible to an observer.

It is further advantageous if, in the infrared range, preferably the near-infrared range, further preferably in the wavelength range between 780 nm and 1400 nm, still further preferably for light with a wavelength of 1064 nm, the transparent laser protective varnish layer has a transmittance of at least 25%, preferably of at least 75%, further preferably of at least 85%. This makes it possible for light of an infrared laser for removing the layers arranged above the transparent laser protective varnish layer, in particular the at least one first color varnish layer, not to be absorbed in the transparent laser protective varnish layer and not to damage or remove it.

It further makes sense if the transparent laser protective varnish layer is heat-resistant, in particular up to a temperature of 250° C., preferably up to 650° C., further preferably up to 1000° C.

It is advantageous if the transparent laser protective varnish layer scatters transmitted light, in particular light in the wavelength range between 380 nm and 780 nm, diffusely, and/or if the transparent laser protective varnish layer has a haze value of at most 50 haze units, in particular of at most 20 haze units.

The haze value is preferably determined in haze units in transmission according to the ASTM D 1003 standard. For example, the haze value is measured with the "BYK hazegard i" meter from Byk-Gardener, Geretsried, Germany. Here, the layer or film to be measured is preferably held in the open sample compartment of the meter, and in particular for the haze value is placed on the so-called "haze port" of the device, wherein the measurement is advantageously carried out by means of standard illuminant D65. The result of the measurement is then preferably displayed on the meter's screen. The haze value is advantageously given in percent (%). It is therefore possible for the unit of the haze value to be percent (%) in this case. The value range of the haze value is therefore preferably 0-100%. It is thus possible for the haze units to be percentage values or for the haze units to represent percentage values. The maximum value is preferably 100%. Values higher than 100% possibly occurring can be caused for example, in particular depending on the measurement principle used, by additional scattered light effects and/or reflection effects during the measurement.

By haze is preferably meant here a diffuse scattering, in particular large-angle scattering, which leads in particular to a decrease in the imaging quality.

Particles or inhomogeneities in the material, at which in particular the light is scattered in all spatial directions, preferably act as scattering centers, wherein advantageously only a low scattering intensity falls on every solid angle. In particular, a reduction of the contrast and/or a milky-cloudy appearance is hereby brought about, wherein this effect is preferably called haze or cloudiness. Thus, the haze value preferably represents a measure of the cloudiness of transparent samples, for example of plastic layers or films.

It is further expedient that the ratio of the light deflected by the transparent laser protective varnish layer from the angle range of less than 2.5° from the direction of the incident light in transmission to the total light transmitted by the transparent laser protective varnish layer is smaller than 0.5, preferably smaller than 0.2. In other words, it is possible for the transparent laser protective varnish layer to deflect less than 50%, preferably less than 20%, of the transmitted light, in particular from the wavelength range between 380 nm and 780 nm, by more than 2.5° from the direction of the incident light beam.

However, it is further also possible for the transparent laser protective varnish layer to have a milky-cloudy appearance and/or for the transparent laser protective varnish layer to deflect more than 30%, preferably more than 45%, further preferably more than 65%, of the transmitted light, in particular from the wavelength range between 380 nm and 780 nm, by more than 2.5° from the direction of the incident light beam. In other words, it is possible for the transparent laser protective varnish layer to deflect less than 30%, preferably less than 45%, further preferably less than 65%, of the transmitted light, in particular from the wavelength range between 380 nm and 780 nm, by less than 2.5° from the direction of the incident light beam.

It is further possible for the ratio of the light deflected by the transparent laser protective varnish layer from the angle range of less than 2.5° from the direction of the incident light in transmission to the total light transmitted by the transparent laser protective varnish layer to be larger than 0.3, preferably larger than 0.45, further preferably larger than 0.65.

This makes it possible for light transmitted through the transparent laser protective varnish layer to be scattered diffusely, preferably in a large solid angle range, further preferably in all spatial directions, with the result that light, in particular of a point light source, is scattered homogeneously, with the result that the transparent laser protective varnish layer appears to be homogeneously illuminated to an observer, in particular despite being illuminated with a point light source.

It is also possible for the transparent laser protective varnish layer to be dyed, in particular for the transparent laser protective varnish layer to be dyed by means of dyes and/or pigments. Preferably, the pigmentation level of the transparent laser protective varnish layer is less than 15%, preferably less than 10%, further preferably less than 5%. In particular, this makes it possible for the transparent laser protective varnish layer in conjunction with layers arranged underneath the transparent laser protective varnish layer, in particular in conjunction with the at least one second color varnish layer, to generate a specific optical impression, such as for example a color mixing effect.

However, it is also possible for the transparent laser protective varnish layer to be colorless and/or to be clearly transparent and/or for the pigmentation level of the transparent laser protective varnish layer to be 0%.

It is advantageous if the transparent laser protective varnish layer is a layer of monomers, oligomers, polymers and/or copolymers, preferably comprising polymethyl methacrylate (PMMA), polyester, polycarbonate (PC), polyamide (PA), polyurethanes (PU) and/or polyvinyl chloride (PVC), further preferably comprising PU and/or PVC, and/or if the transparent laser protective varnish layer has polyacrylate as binder.

It is further also possible for the transparent laser protective varnish layer to have polyetherimides (PEI) and/or polysulfones, such as for example poly(aryl ether sulfone)s (PAES).

It is further also possible for the transparent laser protective varnish layer to cure or to be/to become cured thermally and/or by high-energy radiation. The curing is preferably effected before and/or after the processing of the decorative film or transfer film and/or application of the decorative film or transfer film to a substrate.

Such compositions of the transparent laser protective varnish layer make it possible for layers arranged underneath the transparent laser protective varnish layer preferably to be particularly well protected from mechanical, physical and/or chemical environmental influences.

The transparent laser protective varnish layer preferably protects the at least one second color varnish layer, in particular the layers lying underneath the transparent laser protective varnish layer seen from an observer, from mechanical, physical and/or chemical environmental influences.

Preferably, the at least one first color varnish layer is formed opaque and/or the at least one first color varnish layer has, in particular in the wavelength range between 380 nm and 780 nm, a transmittance of at most 50%, preferably of at most 20%, further preferably of at most 5%. It is hereby achieved that the decorative film, in particular when viewed from the side of the at least one first color varnish layer, generates a dark optical impression, in particular which provides a background that appears dark with regard to a possible backlighting. In particular, a particularly high contrast between the backlighting and this background can thereby be achieved and the backlighting can also be perceived sufficiently well at low backlighting luminous intensities.

The at least one first color varnish layer preferably has a layer thickness of between 0.1 µm and 50 µm, preferably between 0.5 µm and 5.0 µm. As a result, the required opacity of the at least one first color varnish layer on the one hand and the production of a thin and optionally flexible plastic molded article on the other hand can be ensured using the decorative film.

It is further possible for the at least one first color varnish layer to be multi-layered, in particular for the at least one first color varnish layer to be formed from two or more first partial layers, wherein the two or more first partial layers preferably in each case have a layer thickness of between 0.1 µm and 50 µm, further preferably between 0.5 µm and 5.0 µm.

It further makes sense if the two or more first partial layers have different colors, in particular from the RGB color space or the CMYK color space.

By color is meant here in particular a color dot which can be represented in a color model such as e.g. the RGB color model (R=red; G=green; B=blue) or the CMYK color model (C=cyan; M=magenta; Y=yellow; K=black) within the color space.

It is further conceivable for the at least one first color varnish layer to be formed in areas, in particular for the at least one first color varnish layer to be present in at least one second area and not to be present in at least one third area.

It is also advantageous if the at least one first color varnish layer is dyed, in particular if the at least one first color varnish layer is dyed by means of dyes and/or pigments. Preferably, the pigmentation level of the at least one first color varnish layer is between 5% and 35%, preferably between 20% and 25%.

It is thus possible for the at least one first color varnish layer to be dyed dark, in particular black, and/or for the at least one first color varnish layer to have light-absorbing particles, in particular carbon black.

Expediently, the at least one first color varnish layer is formed from polyethylene terephthalate (PET), PMMA, polyethylene naphthalate (PEN), PA and/or acrylonitrile-butadiene-styrene copolymer (ABS) and/or the at least one first color varnish layer has acrylate as binder.

It is also possible for the at least one first color varnish layer to be a first metal layer, in particular to be an optically dense metal layer, which preferably has a lower transmittance than the at least one second color varnish layer, in particular than the second metal layer.

It is further possible for the at least one second color varnish layer also to be a second metal layer, in particular to be an optically thin metal layer, which preferably has a higher transmittance than the at least one first color varnish layer, in particular than the first metal layer.

The first metal layer advantageously has, in particular in the wavelength range between 380 nm and 780 nm, a transmittance of at most 30%, preferably of at most 10%, further preferably of at most 5%.

The second metal layer preferably has, in particular in the wavelength range between 380 nm and 780 nm, a transmittance of more than 10%, preferably of more than 25%, further preferably of more than 50%, still further preferably of more than 75%, furthermore still further preferably of more than 90%.

Furthermore, it is advantageous if the layer thickness of the first metal layer is between 10 nm and 1 µm, preferably between 20 nm and 300 nm.

The layer thickness of the second metal layer is preferably between 1 nm and 500 nm, preferably between 10 nm and 80 nm.

It is hereby achieved in particular that the first metal layer is perceived as opaque by the observer because of its lower transmittance, while the second metal layer is transparent.

The functional relationship between transmittance (T) and optical density (OD) is expressed as follows: $OD = \log(100/T[\%])$.

The transmittance values, as set out above, are determined in particular in the wavelength range between 380 nm and 780 nm, i.e. in the wavelength range visible to the human eye.

The optical density of a metal layer depends, in particular in addition to the layer thickness used, among other things, on the metal used.

It is thus possible for the first metal layer and/or the second metal layer to be formed from aluminum, cobalt, copper, gold, iron, chromium, nickel, silver, platinum, palladium and/or titanium or alloys thereof. Preferably, aluminum is used for the optically denser first metal layer because of its small penetration depth for light from the wavelength range visible to the human eye, and gold, copper, chromium, silver and/or iron are used for the optically thinner second metal layer because of their large penetration depth for light from the wavelength range visible to the human eye.

It is further advantageous for the at least one second color varnish layer to be formed transparent and/or for the at least one second color varnish layer to have, in particular in the wavelength range between 380 nm and 780 nm, a transmittance of at least 10%, preferably of at least 25%, further preferably of at least 75%, still further preferably of at least 90%.

It is thus advantageous if the at least one second color varnish layer can be shone through, in particular can be shone through by means of a backlighting means, and/or if the at least one second color varnish layer is designed such that more than 10%, preferably more than 25%, further preferably more than 75%, still further preferably more than 90%, of the light which is emitted by a backlighting means arranged behind the at least one second color varnish layer in the observation direction is transmitted.

This makes it possible for light to be able to pass through the at least one second color varnish layer and thus to be able to be perceived by an observer viewing the decorative film from the side of the at least one first color varnish layer.

The at least one second color varnish layer advantageously has a layer thickness of between 0.1 μm and 50 μm, preferably between 1.0 μm and 5.0 μm.

Here too, it is possible for the at least one second color varnish layer to be multi-layered, in particular for the at least one second color varnish layer to be formed from two or more second partial layers, wherein the two or more second partial layers preferably in each case have a layer thickness of between 0.1 μm and 50 μm, further preferably between 1.0 μm and 5.0 μm.

The at least one second color varnish layer is preferably formed over the whole surface, in particular the at least one second color varnish layer occupies the entire surface area when viewed perpendicular to the decorative film.

It is further advantageous for the at least one second color varnish layer to scatter, in particular, light in the wavelength range between 380 nm and 780 nm diffusely, and/or for the at least one second color varnish layer to have a haze value of at least 50 haze units, preferably of at least 75 haze units.

It is also advantageous if the at least one second color varnish layer deflects more than 50%, preferably more than 75%, further preferably more than 85%, of the transmitted light, in particular from the wavelength range between 380 nm and 780 nm, by more than 2.5° from the direction of the incident light beam. In other words, it is possible for the at least one second color varnish layer to deflect less than 50%, preferably less than 75%, further preferably less than 85%, of the transmitted light, in particular from the wavelength range between 380 nm and 780 nm, by less than 2.5° from the direction of the incident light beam.

It is further also possible for the ratio of the light deflected by the at least one second color varnish layer from the angle range of less than 2.5° from the direction of the incident light in transmission to the total light transmitted by the at least one second color varnish layer to be larger than 0.5, preferably larger than 0.75, further preferably larger than 0.85.

This also makes it possible for light transmitted through the at least one second color varnish layer to be scattered diffusely, preferably in a large solid angle range, further preferably in all spatial directions, with the result that light, in particular of a point light source, is scattered homogeneously, with the result that the at least one second color varnish layer appears to be homogeneously illuminated to an observer, in particular despite being illuminated with a point light source.

It is thus possible for the at least one second color varnish layer to form a diffuser film and/or for the at least one second color varnish layer to be a diffuser film.

By diffuser film is meant here an in particular self-supporting, dry layer which can be applied for example by means of adhering or laminating or similar methods. Such a diffuser film preferably represents an alternative to a second color varnish layer that is printed or cast in a wet method.

It is further conceivable for the at least one second color varnish layer to be dyed, in particular for the at least one second color varnish layer to be dyed by means of dyes and/or pigments. Preferably, the pigmentation level of the at least one second color varnish layer is between 5% and 80%, preferably between 40% and 45%.

Expediently, the at least one second color varnish layer is formed from PET, PMMA, PEN, PA and/or ABS and/or the at least one second color varnish layer has acrylate as binder.

According to a further embodiment example of the invention the second color varnish layer or a layer adjoining the second color varnish layer is formed as a light-guide layer. On one of its end faces this light-guide layer preferably has at least one light coupling-in surface, in particular in which light of a light source is irradiated into the light-guide layer. It is possible for this light source to be arranged such that in the direction of view it is not arranged underneath the decorative film, but for example laterally offset relative to it. It further makes sense if, at least in areas of surface on its surface pointing towards the transparent laser protective varnish layer, the light-guide layer has at least one light coupling-out surface, which has for example a surface structuring. It is possible here for the at least one light coupling-out surface to be designed such that light scattering diffusely is preferably coupled out uniformly distributed over the at least one light coupling-out surface.

It is further expedient here if a fluorescent dye, preferably in the form of dye particles, is incorporated in the material of the second color varnish layer, which consists for example of polycarbonate or PVC in the embodiment as a light-guide layer, as an alternative or in addition to a surface structuring at least in the area of the at least one light coupling-out surface. It is thus possible for the second color varnish layer to have a fluorescent dye, preferably in the form of dye particles, in particular in the area of the at least one light coupling-out surface. In particular when light is irradiated into the light-guide layer, the dye particles are excited to fluorescence and emit or radiate fluorescent light isotropically, thus also in the direction of the light-guide layer. It is thus possible here to define the color of the coupled-out light when the light source is switched on depending on the fluorescent dye in the plastic material.

It is possible here for the second color varnish layer in the embodiment as a light-guide layer to be designed in particular as a self-supporting, dry layer, which is applied for example by means of adhering or laminating or similar methods. It is further also possible for the second color varnish layer in the embodiment as a light-guide layer to be printed or cast by means of a wet method.

It is further preferred if the decorative film comprises a protective varnish layer, in particular wherein the protective varnish layer is arranged on the side of the decorative film facing an observer.

It is thus possible for the protective varnish layer to form the layer pointing towards an observer and/or for the protective varnish layer to lie or be arranged above the at least one first color varnish layer, the at least one second color varnish layer and/or the transparent laser protective varnish layer in the observation direction. In other words, it is possible for the protective varnish layer to be arranged on the side of the at least one first color varnish layer facing away from the transparent laser protective varnish layer.

The protective varnish layer preferably covers the at least one first color varnish layer in areas or completely in the case of an observation direction perpendicular to a plane spanned by the at least one first color varnish layer, the at least one second color varnish layer and/or the transparent laser protective varnish layer.

The protective varnish layer advantageously protects the layers arranged underneath the protective varnish layer in the observation direction from mechanical, physical and/or chemical environmental influences, in particular at least in those areas in which the protective varnish layer is not removed.

However, it also possible for the protective varnish layer to be arranged on the side of the decorative film facing away from the observer. In other words, it is possible for the protective varnish layer to be arranged on the side of the at least one second color varnish layer facing away from the transparent laser protective varnish layer.

Expediently, the protective varnish layer is formed transparent and/or the protective varnish layer has, in particular in the wavelength range between 380 nm and 780 nm, a transmittance of at least 25%, preferably of at least 35%, further preferably of at least 85%.

It is possible for the protective varnish layer to have a layer thickness of between 0.5 μm and 50 μm, preferably between 4.0 μm and 4.5 μm.

It is further appropriate if the protective varnish layer is formed from monomers, oligomers, polymers and/or copolymers, preferably comprising polymethyl methacrylate (PMMA), polyester, polycarbonate (PC), polyamide (PA), polyurethanes (PU) and/or polyvinyl chloride (PVC), further preferably comprising PU and/or PVC, and/or if the protective varnish layer has polyacrylate as binder.

It is further also possible for the protective varnish layer to have polyetherimides (PEI) and/or polysulfones, such as for example poly(aryl ether sulfone)s (PAES).

It is further also possible for the protective varnish layer to cure or to be/to become cured thermally and/or by high-energy radiation. The curing is preferably effected before and/or after the processing of the decorative film or transfer film and/or application of the decorative film or transfer film to a substrate.

It is further also possible for the protective varnish layer to be dyed, in particular for the protective varnish layer to be dyed by means of dyes and/or pigments. Preferably, the pigmentation level of the protective varnish layer is less than 15%, preferably less than 10%, further preferably less than 5%.

However, it is also possible for the protective varnish layer to be colorless and/or to be clearly transparent and/or for the pigmentation level of the protective varnish layer to be 0%.

It is thus possible for the protective varnish layer to be or to form a clear varnish layer, in particular unpigmented.

The protective varnish layer is preferably clear, in particular the protective varnish layer deflects transmitted light, in particular light in the wavelength range between 380 nm and 780 nm, by less than 8%, preferably by less than 4%, by scattering.

It is further possible for the protective varnish layer, in particular arranged above the at least one first color varnish layer in the observation direction, further to be at least partially removed, in particular completely removed, in the one or more first areas and/or for the protective varnish layer, in particular arranged above the at least one first color varnish layer in the observation direction, further to be at least partially removed in the one or more first areas such that layers arranged underneath the protective varnish layer, in particular the transparent laser protective varnish layer and/or the at least one first and/or second color varnish layer, are no longer protected chemical, physical and/or mechanical environmental influences in the one or more first areas.

Furthermore, it is expedient if the decorative film further comprises an adhesive layer, in particular wherein the adhesive layer forms the side of the decorative film facing an observer or facing away from an observer.

However, it is also conceivable for the decorative film to comprise at least one adhesive layer, in particular for the decorative film to comprise two or more adhesive layers, which preferably form opposite surfaces of the decorative film.

It is thus possible for the adhesive layer to form the layer or surface of the decorative film pointing towards an observer and/or pointing away from an observer and/or to lie or be arranged above the at least one first color varnish layer, the at least one second color varnish layer and/or the transparent laser protective varnish layer in the observation direction and/or for the adhesive layer to lie or be arranged underneath the at least one first color varnish layer, the at least one second color varnish layer and/or the transparent laser protective varnish layer in the observation direction.

The adhesive layer preferably covers the at least one first color varnish layer and/or the at least one second color varnish layer in areas or completely in the case of an observation direction perpendicular to a plane spanned by the at least one first color varnish layer, the at least one second color varnish layer and/or the transparent laser protective varnish layer.

This makes it possible for the decorative film to be able to be applied to a plastic molded article, in particular firmly applied, in particular to be able to be applied such that the decorative film is firmly joined to the plastic molded article.

By the term firmly joined is preferably meant here a durable join of two elements, with the result that they can no longer be separated mechanically without damaging at least one of the elements. Thus, for example, the decorative film and a plastic molded article are firmly joined when there is a durable join between these two elements and the decorative film and/or the plastic molded article cannot be separated without damaging one of the two elements.

The adhesive layer expediently has a layer thickness of between 0.1 μm and 50 μm, preferably between 0.5 μm and 7 μm, further preferably between 2.5 μm and 3.0 μm.

Preferably, the adhesive layer is formed transparent and/or the adhesive layer has, in particular in the wavelength range between 380 nm and 780 nm, a transmittance of at least 45%, preferably of at least 65%, further preferably of at least 95%.

The adhesive layer preferably consists of a material which is clearly transparent after application to the plastic molded article, in particular the adhesive layer consists of a material which deflects light in the wavelength range between 380 nm and 780 nm by less than 8%, preferably by less than 4%, by scattering after application to the plastic molded article.

It is further advantageous if the adhesive layer is a layer of polymers and/or copolymers, in particular comprising PMMA, polyester, PU or PVC, and/or if the adhesive layer has acrylate as binder.

It is also conceivable for the adhesive layer to be dyed, in particular for the adhesive layer to be dyed by means of dyes and/or pigments. Preferably, the pigmentation level of the adhesive layer is between 5% and 50%, preferably between 30% and 35%.

However, it is also conceivable for the adhesive layer to be colorless and/or to be clearly transparent and/or for the pigmentation level of the adhesive layer to be 0%.

According to a further embodiment example of the invention the decorative film has one or more electrical functional layers with at least one electrical functional structure, in particular wherein the at least one electrical functional structure forms a touch sensor panel, which provides a touch panel functionality.

By touch sensor panel is meant here in particular a touch-sensitive sensor which makes it possible to control an electrical functional element, for example a PDA or a control element, for example of a motor vehicle, identified by a symbol or writing. By a touch sensor panel is likewise meant in particular a multi-touch sensor panel which can process several simultaneous touches.

It is possible here for the at least one electrical functional structure to form a capacitive sensor panel.

However, it is also possible for the at least one electrical functional structure to form a resistive or inductive sensor panel.

It is further advantageous if the at least one electrical functional structure additionally has still further functional elements, such as for example electrical supply lines, electrical and/or electronic components, such as for example integrated circuits.

It is also conceivable for the at least one electrical functional structure to be formed single-ply or also multi-ply. It is further possible if the at least one electrical functional structure has a reinforcement layer at least in areas, which is applied for example by means of electroplating and/or by means of printing with metal pigment layers and/or other conductive layers such as for example carbon.

It is thus possible for the decorative film to form a touch sensor and/or for the decorative film to be a touch sensor.

It is further also advantageous if all layers arranged above the transparent laser protective varnish layer in the observation direction are opaque, in particular if all layers arranged above the transparent laser protective varnish layer in the observation direction have a transmittance of at most 50%, preferably of at most 5%, and/or if all layers arranged underneath the transparent laser protective varnish layer in the observation direction are transparent, in particular if all layers arranged underneath the transparent laser protective varnish layer have a transmittance of at least 25%, preferably of at least 45%.

Further preferred designs of the transfer film are described in particular in the following:

The transfer film, in particular hot-stamping film and/or in-mold film, advantageously comprises a carrier film and a transfer ply detachable from the carrier film, wherein the transfer ply comprises a decorative film according to the present invention. It is thus possible for the decorative film to form the transfer ply of the transfer film, which is in particular arranged on the carrier film and detachable from the carrier film.

According to a further embodiment example of the invention the transfer film comprises a detachment layer, which is in particular arranged between the carrier film and the detachable decorative film.

Preferably, the detachment layer has a layer thickness of between 0.01 μm and 10 μm, preferably between 0.1 μm and 5 μm, and/or the detachment layer consists of waxes, polyethylene (PE), polypropylene (PP), cellulose derivatives and/or poly(organo)siloxanes.

Expediently, the carrier film is a transparent carrier film, in particular made of PET, PMMA, PC, ABS or PU, and/or the carrier film has a layer thickness of between 2 μm and 250 μm, preferably between 20 μm and 125 μm.

In the method for producing a transfer film, the layers, in particular the at least one first color varnish layer, the transparent laser protective varnish layer and/or the at least one second color varnish layer, are preferably applied to each other directly, i.e. preferably without further layers being arranged between the layers, in particular between the at least one first color varnish layer, the transparent laser protective varnish layer and/or the at least one second color varnish layer, according to steps b) and c). It is thus possible for the decorative film detachable from the carrier film to comprise at least one first color varnish layer, at least one second color varnish layer and a transparent laser protective varnish layer, wherein the transparent laser protective varnish layer is arranged between the at least one first color varnish layer and the at least one second color varnish layer.

Further preferred designs of the method for decorating a plastic molded article are described in particular in the following:

The decorative film is preferably applied to the plastic molded article in step b) such that the at least one first color varnish layer forms the side facing the observer and the at least one second color varnish layer forms the side facing away from the observer.

It is further possible for the decorative film to be applied by means of transfer methods in step b), in particular hot- and/or cold-transfer methods, such as for example hot stamping, in-mold decoration, insert molding, print mold design, in-mold labeling, laminating and/or bonding.

It is further advantageous for the at least one first color varnish layer to be removed in the one or more first areas by means of the laser in step c) such that the transparent laser protective varnish layer is uncovered.

It is further preferred if the at least one first color varnish layer is removed in the one or more first areas by means of a laser in step c) such that the layer thickness of the transparent laser protective varnish layer in the one or more first areas in which the at least one first color varnish layer has been removed by means of the laser substantially corresponds to the layer thickness of the transparent laser protective varnish layer in those areas in which the at least one first color varnish layer has not been removed by means of the laser. In particular, a possible slight superficial damage of the transparent laser protective varnish layer is acceptable here, preferably as long as the total thickness of the transparent laser protective varnish layer is reduced by no more than 50%, preferably by no more than 30%. In particular, it is hereby ensured in the end product on the one hand that the transparent laser protective varnish layer performs its function of protection from environmental influences for the layers lying underneath and on the other hand that the transparent laser protective varnish layer also performs, or has also performed, its function as a spacer or buffer layer.

The at least one first color varnish layer is advantageously completely removed in the one or more first areas in step c).

It is further possible for a protective varnish layer of the decorative film arranged above the transparent laser protective varnish layer and/or above the at least one first color varnish layer in the observation direction to be at least partially removed in step c).

It is further conceivable for a protective varnish layer arranged above the at least one first color varnish layer in the observation direction to be at least partially removed in the one or more first areas by means of the laser in step c) such that layers arranged underneath the protective varnish layer, in particular the transparent laser protective varnish layer and/or the at least one first and/or second color varnish layer, are no longer protected from chemical, physical and/or mechanical environmental influences in the one or more first areas.

It is thus also possible for a protective varnish layer arranged above the at least one first color varnish layer in the observation direction to be at least partially removed in the one or more first areas by means of the laser in step c) such that it essentially no longer performs its function of protecting the layers lying underneath the protective varnish layer from mechanical, physical and chemical influences.

Furthermore, it is also possible if all layers arranged above the transparent laser protective varnish layer in the observation direction are removed, in particular completely removed, in the one or more first areas in step c).

According to a further embodiment example of the invention the method further comprises the following step, in particular which is carried out between steps a) and b): d) arranging one or more electrical functional layers with at least one electrical functional structure, in particular, on the side of the at least one second color varnish layer facing away from the observer, wherein the at least one electrical functional structure preferably forms a touch sensor panel, which provides a touch panel functionality.

It is further advantageous if the at least one electrical functional structure additionally has still further functional elements, such as for example electrical supply lines, electrical and/or electronic components, such as for example integrated circuits.

It is also conceivable for the at least one electrical functional structure to be formed single-ply or also multi-ply. It is further possible if the at least one electrical functional structure has a reinforcement layer at least in areas, which is applied for example by means of electroplating and/or by means of printing with metal pigment layers and/or other conductive layers such as for example carbon.

The one or more electrical functional layers with at least one electrical functional structure are preferably arranged between the decorative film and the plastic molded article. It is thus possible for the one or more electrical functional layers to be arranged on the side of the at least one second color varnish layer facing away from the transparent laser protective varnish layer.

It is thus possible for the plastic molded article, in particular the plastic molded article decorated with the decorative film, to form and/or to be a touch sensor.

It is further advantageous if the one or more electrical functional layers arranged in step d) with at least one electrical functional structure are firmly joined to the decorative film and the plastic molded article in step b).

The method preferably further comprises the following step: e) arranging a backlighting device, in particular comprising organic light-emitting diodes (OLEDs), inorganic light-emitting diodes (LEDs), micro-LEDs (mLEDs) and/or quantum-dot light-emitting diodes (QLEDs), wherein the backlighting device is preferably arranged on the side of the plastic molded article facing away from the decorative film.

However, it is also possible for the backlighting device to comprise incandescent lamps, halogen lamps, gas-discharge lamps and/or fluorescent lamps, in particular induction lamps.

Less preferably, the backlighting device comprises lasers and/or chemico-physical illuminants, such as for example luminous paints or glow sticks.

The backlighting device is expediently firmly attached in step e), in particular bonded or laminated or also mechanically secured, for example screwed or riveted.

It is further also possible for a laser with a beam diameter at the focal point of at least 50 μm, preferably at least 100 μm, to be used in step c).

It is also possible to focus the laser beam by means of one or more lenses, in particular with a focal length of between 100 mm and 500 mm, preferably between 200 mm and 300 mm, further preferably of 254 mm.

It is further preferred if a laser, in particular a fiber laser, is used in step c), wherein the laser emits coherent light from the infrared range, preferably the near-infrared range, further preferably light from the wavelength range between 780 nm and 1400 nm, still further preferably light with a wavelength of 1064 nm.

Preferably, the laser power in step c) is between 0.05 W and 100 W, preferably between 1 W and 20 W, further preferably between 5 W and 10 W.

It is expedient if the laser beam is deflected by means of movable mirrors, in particular by means of a laser scanning module, along the one or more first areas in step c).

According to a further embodiment example of the invention the laser is operated at a writing speed of at most 3000 mm/s, preferably at a writing speed of between 500 mm/s and 2500 mm/s, and/or the laser is operated at a pulse frequency of between 1 Hz and 1000 kHz, preferably between 1 kHz and 200 kHz.

However, it is further also possible for the laser to be operated continuously.

Furthermore, it is also possible for the decorative film to be applied to the plastic molded article by means of back-injection molding in step b). It makes sense here if the method further comprises the following steps:

placing the decorative film in an injection mold back-injection molding the decorative film with a plastic compound such that the decorative film firmly joins to the plastic compound and in particular that the decorative film forms a first surface of the plastic molded article. The cured plastic compound here preferably forms the plastic molded article.

It is further possible for further steps, in particular for further processing the plastic molded article, to be carried out in particular after steps a), b), c), d) and/or e). It thus possible, for example, for the plastic molded article, in particular the plastic molded article decorated with the decorative film, to be further processed with one of the further steps selected from: varnishing with further layers, PU flooding, overspraying or overlaying with a further plastic component, milling, punching, deep-drawing, polishing and/or stamping.

Further preferred designs of the plastic molded article are described in particular, among other things, in the following:

According to a further embodiment example of the invention the one or more first areas, when viewed perpendicular to the decorative film, have a line width of at least 50 μm, preferably of at least 100 μm, and/or the one or more first areas, when viewed perpendicular to the decorative film, have a line width of at most 2 mm, preferably of at most 1 mm, further preferably of at most 0.5 mm.

It is also possible for the plastic molded article to have a layer thickness of between 0.5 mm and 10 mm, preferably between 0.8 mm and 5 mm.

It is further advantageous for the plastic molded article to have at least one layer of a thermoplastic material, which is in particular arranged on the side of the at least one second color varnish layer facing away from the observer.

It is thus possible for the at least one layer of a thermoplastic material to be arranged on the at least one second color varnish layer facing away from the observer.

It is also possible for the plastic molded article to have the following layer structure, in particular wherein the first-named layer forms the side facing away from the observer:

at least one layer of a thermoplastic material
optionally an adhesive layer
the at least one second color varnish layer
the transparent laser protective varnish layer
the at least one first color varnish layer
optionally a protective varnish layer It is further also possible for the plastic molded article to have the following layer structure, in particular wherein the first-named layer forms the side facing away from the observer:
at least one layer of a thermoplastic material
optionally an adhesive layer
optionally a protective varnish layer
the at least one first color varnish layer
the transparent laser protective varnish layer
the at least one second color varnish layer Preferably, the at least one layer of a thermoplastic material is transparent, in particular the at least one layer of a thermoplastic material has a transparency of between 5% and 98%, in particular in the wavelength range between 380 nm and 780 nm, and/or the at least one layer of a thermoplastic material is formed from one of the following materials: ABS, PC, ABS/PC, PC/ABS, PMMA, polypropylene (PP), PA, thermoplastic polyurethane (TPU). This makes it possible to ensure a good backlighting of the plastic molded article.

In particular through the combination or variation of the transparency values and/or the light-scattering properties of the at least one first color varnish layer, the at least one second color varnish layer and/or the transparent laser protective varnish layer, preferably in combination with the design of the one or more first areas, very different optical properties can be achieved.

For example, it is possible for the at least one first color varnish layer to be designed opaque and for the one or more first areas, when viewed perpendicular to the decorative film, to have a line width of at most 2 mm, preferably of at most 1 mm, further preferably of at most 0.5 mm. If, for example in addition to the transparent laser protective varnish layer, the at least one second color varnish layer is also designed transparent and both layers preferably have a transmittance of for example more 45%, further preferably of more than 65%, and at least one of these layers is further also formed diffusely scattering, then the optical impression is generated for an observer, in particular when the plastic molded article is viewed from the side facing away from the at least one layer of a thermoplastic material and/or from the side of the at least one first color varnish layer, that the plastic molded article is opaque when the backlighting is deactivated. If for example such a plastic molded article is backlit, however, the one or more first areas are recognizable for the observer and further also appear to be homogeneously backlit because of the diffusely scattering properties of the transparent laser protective varnish layer and/or the at least one second color varnish layer. In particular, such an optical effect is also called a "dead front effect", as the decorative elements formed by the one or more first areas, such as for example symbols or patterns or writing, only become visible when backlit.

It is therefore possible, for example, to set or control the visibility of the one or more first areas for an observer by means of the contrast between the one or more first areas removed and the areas not removed of the at least one first color varnish layer.

The at least one first color varnish layer preferably has a difference in the transmittance of at least 5%, further preferably of from at least 10% to 95%, still further preferably of from at least 15% to 85%, between the one or more first areas in which the at least one first color varnish layer is removed and those areas in which the at least one first color varnish layer is not removed.

It is therefore further also possible to set or control the visibility of the one or more first areas for an observer by means of the transparency values of the at least one second color varnish layer and/or the transparent laser protective varnish layer and/or the at least one layer of a thermoplastic material. Thus, for example, a reduction of the transparency values of these layers has the result that the visibility of the one or more first areas is lessened and at the same time the impression of a high opacity of the first color varnish layer is given in the non-backlit state. The one or more first areas are then recognizable for an observer in particular only in the backlit state.

It is further conceivable for the at least one layer of a thermoplastic material to be dyed, in particular for the at least one layer of a thermoplastic material to be dyed by means of dyes and/or pigments. Preferably, the pigmentation level of the at least one layer of a thermoplastic material is less than 15%, preferably less than 10%, further preferably less than 5%.

Thus, it is further advantageous if the plastic molded article has one or more electrical functional layers with at least one electrical functional structure, in particular in the at least one second color varnish layer facing away from the observer, wherein the at least one electrical functional structure preferably forms a touch sensor panel, which provides a touch panel functionality.

It is further advantageous if the at least one electrical functional structure additionally has still further functional elements, such as for example electrical supply lines, electrical and/or electronic components, such as for example integrated circuits.

It is also conceivable for the at least one electrical functional structure to be formed single-ply or also multi-ply. It is further possible if the at least one electrical functional structure has a reinforcement layer at least in areas, which is applied for example by means of electroplating and/or by means of printing with metal pigment layers and/or other conductive layers such as for example carbon.

The one or more electrical functional layers with at least one electrical functional structure are preferably arranged between the decorative film and the at least one layer of thermoplastic material. It is thus possible for the one or more electrical functional layers to be arranged on the side of the at least one second color varnish layer facing away from the transparent laser protective varnish layer.

According to a further embodiment example of the invention the plastic molded article has a backlighting device, in particular comprising organic light-emitting diodes (OLEDs), inorganic light-emitting diodes (LEDs), micro-LEDs (mLEDs) and/or quantum-dot light-emitting diodes (QLEDs), wherein the backlighting device is preferably arranged on the side of the at least one layer of thermoplastic material facing away from the decorative film.

BRIEF DESCRIPTION OF THE DRAWINGS

Embodiment examples of the invention are explained below by way of example with the aid of the accompanying figures which are not true to scale.

DETAILED DESCRIPTION OF THE PREFERRED EMBODIMENTS

FIG. 1a to FIG. 1g schematically show sectional representations of decorative films 1.

Figure 1A:
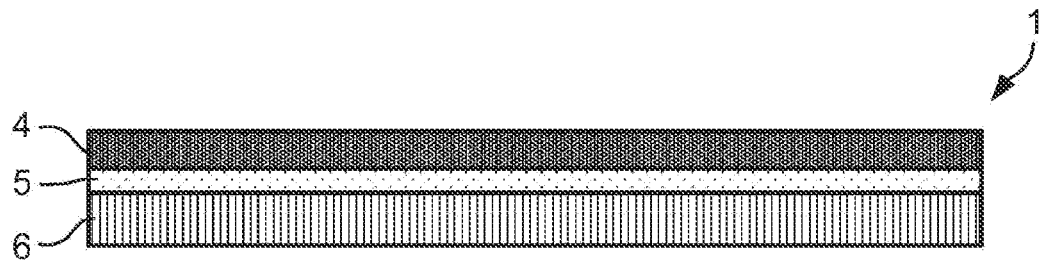
FIG. 1a to FIG. 1g schematically show sectional representations of decorative films FIG. 2 schematically shows a diffusely scattering layer FIG. 3 schematically shows a sectional representation of a transfer film FIG. 4a to FIG. 4d schematically show method steps for producing a transfer film FIG. 5a to FIG. 5c schematically show method steps for decorating a plastic molded article FIG. 6a to FIG. 6c schematically show method steps for decorating a plastic molded article FIG. 7 schematically shows a method step FIG. 8a to FIG. 8e schematically show sectional representations of a plastic molded article FIG. 9 schematically shows a top view of a decorative film and/or of a plastic molded article

The decorative film 1 shown in FIG. 1a, in particular for decorating a plastic molded article, comprises a color varnish layer 4, a color varnish layer 6 and a transparent laser protective varnish layer 5, wherein the transparent laser protective varnish layer 5 is arranged between the color varnish layer 4 and the color varnish layer 6.

Here and in the following, in particular the color varnish layer 4 is the first color varnish layer and the color varnish layer 6 is the second color varnish layer in the above sense. Thus, in particular, the color varnish layer 4 represents the first color varnish layer and the color varnish layer 6 represents the second color varnish layer according to the above statements.

It is therefore possible for the color varnish layer 4 to be arranged on the side of the transparent laser protective varnish layer 5 facing an observer and for the color varnish layer 6 to be arranged on the side of the transparent laser protective varnish layer 5 facing away from the observer. It is thus possible for the color varnish layer 4 to form the side facing an observer. It is thus also possible for the color varnish layer 6 to be arranged underneath the transparent laser protective varnish layer 5 and/or underneath the color varnish layer 4 in the observation direction.

By a transparent laser protective varnish layer 5 is preferably meant a transparent protective varnish layer, in particular a transparent intermediate protective varnish layer, which protects the color varnish layer 6, in particular the layers lying underneath the transparent intermediate protective varnish layer seen from an observer, from mechanical, physical and/or chemical environmental influences and/or is designed such that it further acts as a spacer or buffer layer for the stripping laser. Thus, for example, the transparent laser protective varnish layer 5 shown in FIG. 1 is a transparent protective varnish layer, in particular a transparent intermediate protective varnish layer.

The transparent laser protective varnish layer 5 preferably has a layer thickness of between 0.5 µm and 50 µm, preferably between 2.0 µm and 2.5 µm. The transparent laser protective varnish layer 5 shown in FIG. 1a has for example a layer thickness of between 2.0 µm and 2.5 µm.

It is further advantageous if the transparent laser protective varnish layer 5 has, in particular in the wavelength range between 380 nm and 780 nm, a transmittance of at least 25%, preferably of at least 75%, further preferably of at least 85%. The transparent laser protective varnish layer shown in FIG. 1a has for example a transmittance of at least 75%, preferably of at least 85%.

It is further also conceivable for the transparent laser protective varnish layer 5 to have, in the infrared range, preferably the near-infrared range, further preferably in the wavelength range between 780 nm and 1400 nm, still further preferably for light with a wavelength of 1064 nm, a transmittance of at least 25%, preferably of at least 75%, further preferably of at least 85%.

It further makes sense if the transparent laser protective varnish layer 5 is heat-resistant, in particular up to a temperature of 250° C., preferably up to 650° C., further preferably up to 1000° C.

Preferably, the transparent laser protective varnish layer 5 scatters transmitted light, in particular light in the wavelength range between 380 nm and 780 nm, diffusely, and/or the transparent laser protective varnish layer 5 has a haze value of at most 50 haze units, preferably of at most 20 haze units.

The haze value is preferably determined in haze units in transmission according to the ASTM D 1003 standard. For example, the haze value is measured with the "BYK hazegard i" meter from Byk-Gardener, Geretsried, Germany. Here, the layer or film to be measured is preferably held in the open sample compartment of the meter, and in particular for the haze value is placed on the so-called "haze port" of the device, wherein the measurement is advantageously carried out by means of standard illuminant D65. The result of the measurement is then preferably displayed on the meter's screen. The haze value is advantageously given in percent (%). It is therefore possible for the unit of the haze value to be percent (%) in this case. The value range of the haze value is therefore preferably 0-100%. It is thus possible for the haze units to be percentage values or for the haze units to represent percentage values. The maximum value is preferably 100%. Values higher than 100% possibly occurring can be caused for example, in particular depending on the measurement principle used, by additional scattered light effects and/or reflection effects during the measurement.

By haze is preferably meant here a diffuse scattering, in particular large-angle scattering, which leads in particular to a decrease in the imaging quality. Particles or inhomogeneities in the material, at which in particular the light is scattered in all spatial directions, preferably act as scattering centers, wherein advantageously only a low scattering intensity falls on every solid angle. In particular, a reduction of the contrast and/or a milky-cloudy appearance is hereby brought about, wherein this effect is preferably called haze or cloudiness. Thus, the haze value preferably represents a measure of the cloudiness of transparent samples, for example of plastic layers or films.

It is further expedient that the ratio of the light deflected by the transparent laser protective varnish layer 5 from the angle range of less than 2.5° from the direction of the incident light in transmission to the total light transmitted by the transparent laser protective varnish layer 5 is smaller than 0.5, preferably smaller than 0.2. In other words, it is possible for the transparent laser protective varnish layer 5 to deflect less than 50%, preferably less than 20%, of the transmitted light, in particular from the wavelength range between 380 nm and 780 nm, by more than 2.5° from the direction of the incident light beam.

Preferably, the transparent laser protective varnish layer 5 has a milky-cloudy appearance and/or the transparent laser protective varnish layer 5 deflects more than 30%, preferably more than 45%, further preferably more than 65%, of the transmitted light, in particular from the wavelength range between 380 nm and 780 nm, by more than 2.5° from the direction of the incident light beam. In other words, it is possible for the transparent laser protective varnish layer 5 to deflect less than 30%, preferably less than 45%, further preferably less than 65%, of the transmitted light, in particular from the wavelength range between 380 nm and 780 nm, by less than 2.5° from the direction of the incident light beam.

It is further possible for the ratio of the light deflected by the transparent laser protective varnish layer 5 from the angle range of less than 2.5° from the direction of the incident light in transmission to the total light transmitted by the transparent laser protective varnish layer 5 to be larger than 0.3, preferably larger than 0.45, further preferably larger than 0.65.

It is also possible for the transparent laser protective varnish layer 5 to be dyed, in particular for the transparent laser protective varnish layer 5 to be dyed by means of dyes and/or pigments. Preferably, the pigmentation level of the transparent laser protective varnish layer 5 is less than 15%, preferably less than 10%, further preferably less than 5%.

However, it is also possible for the transparent laser protective varnish layer 5 to be colorless and/or to be clearly transparent and/or for the pigmentation level of the transparent laser protective varnish layer 5 to be 0%. Thus, the pigmentation level of the transparent laser protective varnish layer 5 shown in FIG. 1a is for example 0%, with the result that the transparent laser protective varnish layer 5 shown in FIG. 1a is in particular an unpigmented clear varnish layer.

The transparent laser protective varnish layer 5 is preferably a layer of monomers, oligomers, polymers and/or copolymers, which preferably comprises polymethyl methacrylate (PMMA), polyester, polycarbonate (PC), polyamide (PA), polyurethanes (PU) and/or polyvinyl chloride (PVC), further preferably PU and/or PVC. It is further possible for the transparent laser protective varnish layer 5 to have polyacrylate as binder. Thus, for example, the transparent laser protective varnish layer 5 shown in FIG. 1a has polyacrylate as binder.

It is further also possible for the transparent laser protective varnish layer 5 to have polyetherimides (PEI) and/or polysulfones, such as for example poly(aryl ether sulfone)s (PAES).

It is further also possible for the transparent laser protective varnish layer 5 to cure or to be/to become cured thermally and/or by high-energy radiation. The curing is preferably effected before and/or after the processing of the decorative film or transfer film and/or application of the decorative film or transfer film to a substrate.

The transparent laser protective varnish layer 5 preferably protects the color varnish layer 6, in particular the layers lying underneath the transparent laser protective varnish layer 5 seen from an observer, from mechanical, physical and/or chemical environmental influences.

The color varnish layer 4 is preferably a layer of polyethylene terephthalate (PET), PMMA, polyethylene naphthalate (PEN), PA and/or acrylonitrile-butadiene-styrene copolymer (ABS). It is further possible for the color varnish layer 4 to on acrylate as binder. Thus, for example, the color varnish layer 4 shown in FIG. 1a has acrylate as binder.

The color varnish layer 4 preferably has a layer thickness of between 0.1 µm and 50 µm, preferably between 0.5 µm and 5.0 µm. The color varnish layer shown in FIG. 1a has for example a layer thickness of between 5.0 µm and 5.5 µm.

Furthermore, the color varnish layer 4 is preferably formed opaque and/or advantageously has, in particular in the wavelength range between 380 nm and 780 nm, a transmittance of at most 50%, preferably of at most 20%, further preferably of at most 5%. The color varnish layer 4 shown in FIG. 1a has for example a transmittance of at most 5%.

It is also advantageous if the color varnish layer 4 is dyed, in particular if the at least one color varnish layer 4 is dyed by means of dyes and/or pigments. Preferably, the pigmentation level of the color varnish layer 4 is between 5% and 35%, preferably between 20% and 25%. The color varnish layer 4 shown in FIG. 1a is for example dyed by means of pigments and further has for example a pigmentation level of between 5% and 35%, preferably between 20% and 25%.

It is further also possible for the color varnish layer 4 to be dyed dark, in particular black, and/or for the color varnish layer 4 to have light-absorbing particles, in particular carbon black.

The color varnish layer 6 is preferably formed from PET, PMMA, PEN, PA and/or ABS and/or has acrylate as binder. Thus, the color varnish layer 6 shown in FIG. 1a has for example acrylate as binder.

Furthermore, the color varnish layer 6 preferably has a layer thickness of between 0.1 µm and 50 µm, preferably between 1.0 µm and 5.0 µm. Thus, the color varnish layer 6 shown in FIG. 1a has for example a layer thickness of between 6.0 µm and 7.0 µm.

It is further advantageous for the color varnish layer 6 to be formed transparent and/or for color varnish layer 6 to have, in particular in the wavelength range between 380 nm and 780 nm, a transmittance of at least 10%, preferably of at least 25%, further preferably of at least 75%, still further preferably of at least 90%. Thus, the color varnish layer shown in FIG. 1a has for example a transmittance of at least 25%, preferably of at least 45%.

It is thus advantageous if the color varnish layer 6 can be shone through, in particular can be shone through by means of a backlighting means, and/or if the color varnish layer 6 is designed such that more than 10%, preferably more than 25%, further preferably more than 75%, still further preferably more than 90%, of the light which is emitted by a backlighting means arranged behind the color varnish layer 6 in the observation direction is transmitted.

The color varnish layer 6, as shown in FIG. 1a, is preferably formed over the whole surface, in particular the color varnish layer 6 occupies the entire surface area when viewed perpendicular to the decorative film 1.

It is further advantageous for the color varnish layer 6 to scatter, in particular, light in the wavelength range between 380 nm and 780 nm diffusely, and/or for the color varnish layer 6 to have a haze value of at least 50 haze units, preferably of at least 75 haze units.

It is also advantageous if the color varnish layer 6 deflects more than 50%, preferably more than 75%, further preferably more than 85%, of the transmitted light, in particular from the wavelength range between 380 nm and 780 nm, by more than 2.5° from the direction of the incident light beam. In other words, it is possible for the color varnish layer 6 to deflect less than 50%, preferably less than 75%, further preferably less than 85%, of the transmitted light, in particular from the wavelength range between 380 nm and 780 nm, by less than 2.5° from the direction of the incident light beam.

It is further also possible for the ratio of the light deflected by the color varnish layer 6 from the angle range of less than 2.5° from the direction of the incident light in transmission to the total light transmitted by the color varnish layer 6 to be larger than 0.5, preferably larger than 0.75, further preferably larger than 0.85.

This also makes it possible for light transmitted through the color varnish layer 6 to be scattered diffusely, preferably in a large solid angle range, preferably in all spatial directions, with the result that light, in particular of a point light source, is scattered homogeneously, with the result that the color varnish layer 6 appears to be homogeneously illuminated to an observer, in particular despite being illuminated with a point light source.

It is thus possible for the color varnish layer 6 to form a diffuser film and/or for the color varnish layer 6 to be a diffuser film.

By diffuser film is meant here an in particular self-supporting, dry layer which can be applied for example by means of laminating or similar methods. Such a diffuser film preferably represents an alternative to a second color varnish layer that is printed or cast in a wet method.

Further, the color varnish layer 6 is preferably also dyed, in particular dyed by means of dyes and/or by means of pigments. It is preferably possible here for the pigmentation level of the color varnish layer 6 to be between 5% and 80%, preferably between 40% and 45%. The color varnish layer 6 shown in FIG. 1a is for example a layer dyed by means of pigments, wherein the pigmentation level is for example between 40% and 45%.

According to a further embodiment example of the invention the color varnish layer 6 or a layer adjoining the second color varnish layer 6 is formed as a light-guide layer. On one of its end faces this light-guide layer preferably has a light coupling-in surface, in particular in which light of a light source is irradiated into the light-guide layer. It is possible for this light source to be arranged such that in the direction of view it is not arranged underneath the decorative film 1, but for example laterally offset relative to it. It further makes sense if, at least in areas of surface on its surface pointing towards the transparent laser protective varnish layer 5, the light-guide layer has light coupling-out surfaces, which have for example a surface structuring. It is possible here for the light coupling-out surfaces to be designed such that light scattering diffusely is preferably coupled out uniformly distributed over the light coupling-out surfaces.

It is further expedient here if a fluorescent dye, preferably in the form of dye particles, is incorporated in the material of the color varnish layer 6, which consists for example of polycarbonate or PVC in the embodiment as a light-guide layer, as an alternative or in addition to a surface structuring, at least in the area of the light coupling-out surfaces. It is thus possible for the color varnish layer 6 to have a fluorescent dye, preferably in the form of dye particles, in particular in the area of the light coupling-out surfaces. In particular when light is irradiated into the light-guide layer, the dye particles are excited to fluorescence and radiate fluorescent light isotropically, thus also in the direction of the light-guide layer. It is thus possible here to define the color of the coupled-out light when the light source is switched on depending on the fluorescent dye in the plastic material.

It is possible here for the color varnish layer 6 in the embodiment as a light-guide layer to be designed in particular as a self-supporting, dry layer, which is applied for example by means of adhering or laminating or similar methods. It is further also possible for the color varnish layer 6 in the embodiment as a light-guide layer to be printed or cast by means of a wet method.

Figure 1B:
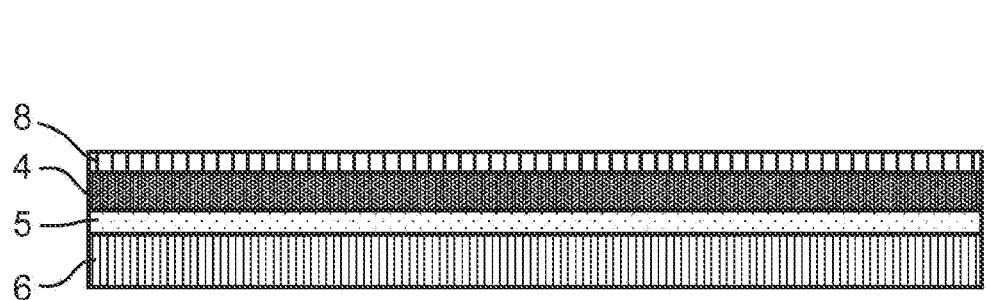

The decorative film 1 shown in FIG. 1b, in particular for decorating a plastic molded article, comprises a color varnish layer 4, a color varnish layer 6, a protective varnish layer 8 and a transparent laser protective varnish layer 5, wherein the transparent laser protective varnish layer 5 is arranged between the color varnish layer 4 and the color varnish layer 6.

As shown in FIG. 1b, the protective varnish layer 8 is arranged above the color varnish layer 4. Thus, if for example the color varnish layer 4 forms the side of the decorative film 1 facing an observer, then the protective varnish layer 8 is arranged on the side of the decorative film 1 facing the observer.

By the terms underneath and/or above is meant here in particular the arrangement of layers in relation to another layer when viewed by an observer from an observation direction. Thus, it is expedient if the terms underneath and/or above represent a frame of reference. Thus, for example, as shown in FIG. 1b, the color varnish layer 6 is arranged underneath the transparent laser protective varnish layer 5 in the observation direction.

It is thus possible for the protective varnish layer 8 to form the layer pointing towards an observer and/or for the protective varnish layer 8, as shown in FIG. 1b, to lie or be arranged above the color varnish layer 4, the color varnish layer 6 and/or the transparent laser protective varnish layer 5 in the observation direction. Thus, as shown in FIG. 1b, the protective varnish layer 8 is arranged on the side of the color varnish layer 4 facing away from the transparent laser protective varnish layer 5.

As shown in FIG. 1b, the protective varnish layer 8 preferably completely covers the color varnish layer 4 in the case of an observation direction perpendicular to a plane spanned by the color varnish layer 4, the color varnish layer 6 and/or the transparent laser protective varnish layer 5. However, it is also possible for the protective varnish layer 8 to cover the color varnish layer 4 only in areas.

The protective varnish layer 8 advantageously protects the layers arranged underneath the protective varnish layer 8 in the observation direction from mechanical, physical and/or chemical environmental influences, in particular at least in those areas in which the protective varnish layer 8 is not removed again later or has been applied.

As an alternative to the embodiment variant shown in FIG. 1b, however, it is also possible for the protective varnish layer 8 to be arranged on the side of the decorative film 1 facing away from the observer. It is thus possible for the protective varnish layer to be arranged on the side of the color varnish layer 6 facing away from the transparent laser protective varnish layer 5.

Expediently, the protective varnish layer 8 is formed transparent and/or the protective varnish layer 8 has, in particular in the wavelength range between 380 nm and 780 nm, a transmittance of at least 25%, preferably of at least 35%, further preferably of at least 85%. Thus, the protective varnish layer 8 shown in FIG. 1b is a transparent protective varnish layer 8, which has for example a transmittance of at least 85%.

The layer thickness of the protective varnish layer 8 is preferably between 0.5 μm and 50 μm, further preferably between 4.0 μm and 4.5 μm. The protective varnish layer 8 shown in FIG. 1b has for example a layer thickness of between 4.0 μm and 4.5 μm.

Further, the protective varnish layer 8 is preferably a layer of monomers, oligomers, polymers and/or copolymers, preferably comprising polymethyl methacrylate (PMMA), polyester, polycarbonate (PC), polyamide (PA), polyurethanes (PU) and/or polyvinyl chloride (PVC), further preferably comprising PU and/or PVC. It is further possible for the protective varnish layer 8 to have polyacrylate as binder.

It is further also possible for the protective varnish layer 8 to have polyetherimides (PEI) and/or polysulfones, such as for example poly(aryl ether sulfone)s (PAES).

It is further also possible for the protective varnish layer 8 to cure or to be/to become cured thermally and/or by high-energy radiation. The curing is preferably effected before and/or after the processing of the decorative film or transfer film and/or application of the decorative film or transfer film to a substrate.

Thus, the protective varnish layer shown in FIG. 1b has for example acrylate, in particular reactively curing acrylates, as binder, wherein the curing is preferably effected thermally and/or by means of UV radiation.

It is further also possible for the protective varnish layer 8 to be dyed, in particular for the protective varnish layer to be dyed by means of dyes and/or pigments. Preferably, the pigmentation level of the protective varnish layer 8 is less than 15%, preferably less than 10%, further preferably less than 5%.

However, it is also possible for the protective varnish layer 8 to be colorless and/or to be clearly transparent and/or for the pigmentation level of the protective varnish layer to be 0%.

The protective varnish layer 8 is preferably clear, in particular the protective varnish layer 8 deflects transmitted light, in particular light in the wavelength range between 380 nm and 780 nm, by less than 8%, preferably by less than 4%, by scattering.

Thus, the protective varnish layer 8 shown in FIG. 1b is for example an unpigmented clear varnish layer.

With respect to the design of further layers shown in FIG. 1b, in particular the color varnish layer 4, the transparent laser protective varnish layer 5 and the color varnish layer 6, reference is made here to the above statements.

Figure 1C:
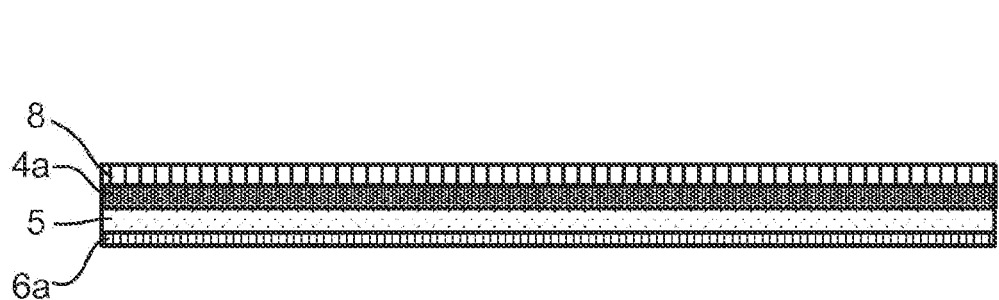

The decorative film 1 shown in FIG. 1c corresponds to the decorative film shown in FIG. 1b with the difference that the color varnish layer 4 is formed as a metal layer 4a and the color varnish layer 6 is formed as a metal layer 6a.

The metal layer 4a is advantageously an optically dense metal layer, which preferably has a lower transmittance than the metal layer 6a. Similarly, it is advantageous if the metal layer 6a is an optically thin metal layer, which preferably has a higher transmittance than the metal layer 4a.

The metal layer 4a advantageously has, in particular in the wavelength range between 380 nm and 780 nm, a transmittance of at most 30%, preferably of at most 10%, further preferably of at most 5%.

The metal layer 6a preferably has, in particular in the wavelength range between 380 nm and 780 nm, a transmittance of more than 10%, preferably of more than 25%, further preferably of more than 50%, still further preferably of more than 75%, furthermore still further preferably of more than 90%.

Furthermore, it is advantageous if the layer thickness of the first metal layer 4a is between 10 nm and 1 µm, preferably between 20 nm and 300 nm.

The layer thickness of the second metal layer 6a is preferably between 1 nm and 500 nm, preferably between 10 nm and 80 nm.

It is hereby achieved in particular that the metal layer 4a is perceived as opaque by the observer because of its lower transmittance, while the metal layer 6a is transparent.

The functional relationship between transmittance (T) and optical density (OD) is expressed as follows: OD=log (100/T[%]).

The transmittance values, as set out above, are determined in particular in the wavelength range between 380 nm and 780 nm, i.e. in the wavelength range visible to the human eye.

The optical density of a metal layer depends, in particular in addition to the layer thickness used, among other things, on the metal used.

It is thus possible for the metal layer 4a and/or the metal layer 6a to be formed from aluminum, cobalt, copper, gold, iron, chromium, nickel, silver, platinum, palladium and/or titanium or alloys thereof. Preferably, aluminum is used for the optically denser metal layer 4a because of its small penetration depth for light from the wavelength range visible to the human eye, and gold, copper, chromium, silver and/or iron are used for the optically thinner metal layer 6a because of their large penetration depth for light from the wavelength range visible to the human eye.

Figure 1D:
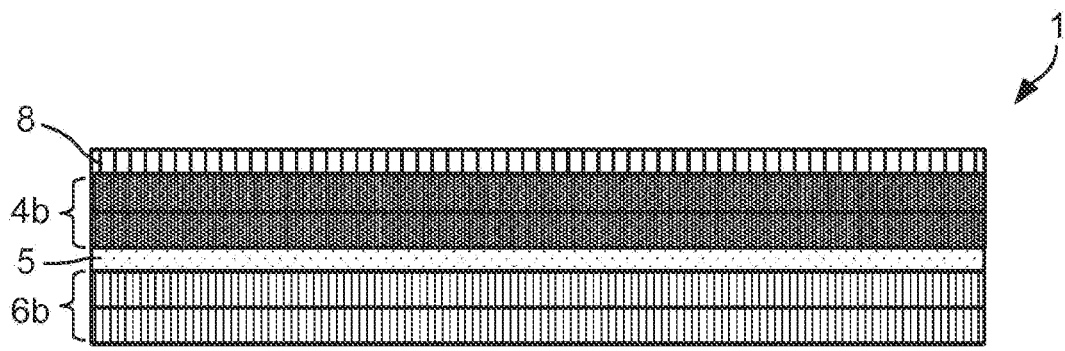

The decorative film 1 shown in FIG. 1d corresponds to the decorative film 1 shown in FIG. 1b with the difference that the color varnish layer 4b and the color varnish layer 6b is formed multi-layered.

As shown in FIG. 1d, the color varnish layer 4b is formed from two partial layers, wherein the two partial layers in each case have in particular a layer thickness of between 0.1 µm and 50 µm, preferably between 0.5 µm and 5.0 µm.

Likewise, as shown in FIG. 1d, the color varnish layer 6b is also formed from two partial layers, wherein the two partial layers preferably in each case have a layer thickness of between 0.1 µm and 50 µm, further preferably between 1.0 µm and 5.0 µm.

It is further possible for the two partial layers to have different colors in each case, in particular from the RGB color space or the CMYK color space.

By color is meant here in particular a color dot which can be represented in a color model such as e.g. the RGB color model (R=red; G=green; B=blue) or the CMYK color model (C=cyan; M=magenta; Y=yellow; K=black) within the color space.

Figure 1E:
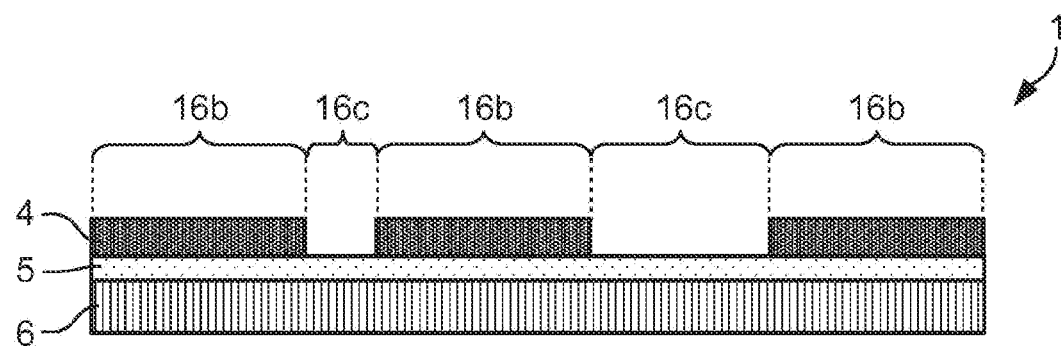

The decorative film 1 shown in FIG. 1e corresponds to the decorative film 1 shown in FIG. 1a with the difference that the color varnish layer 4 is formed in areas.

As shown in FIG. 1e, the color varnish layer 4 is present in the areas 16b and not present in the areas 16c.

Such a color varnish layer 4 formed in areas can be generated for example by means of printing methods, such as relief printing, in particular flexographic printing, planographic printing, in particular offset printing, gravure printing, inkjet printing, and/or silkscreen printing, in particular screen printing. It is further also possible, in particular if the color varnish layer 4 is formed as a metal layer 4a, for this to be generated by means of metallization methods such as for example CVD (chemical vapor deposition) methods and/or PVD (physical vapor deposition) methods, preferably using a mask, in particular a photolithographic mask.

By area is meant here in particular in each case a defined surface area of a layer or ply which is occupied when viewed perpendicular to a plane spanned by the decorative film 1, in particular by the color varnish layer 4, the transparent laser protective varnish layer 5 and/or the color varnish layer 6. Thus, for example, the color varnish layer 4 has areas 16b in which the color varnish layer 4 is present and areas 16c in which the color varnish layer 4 is not present, wherein each of the areas 16b, 16c in each case occupies a defined surface area when viewed perpendicular to a plane spanned by the transparent laser protective varnish layer 5.

Figure 1F:
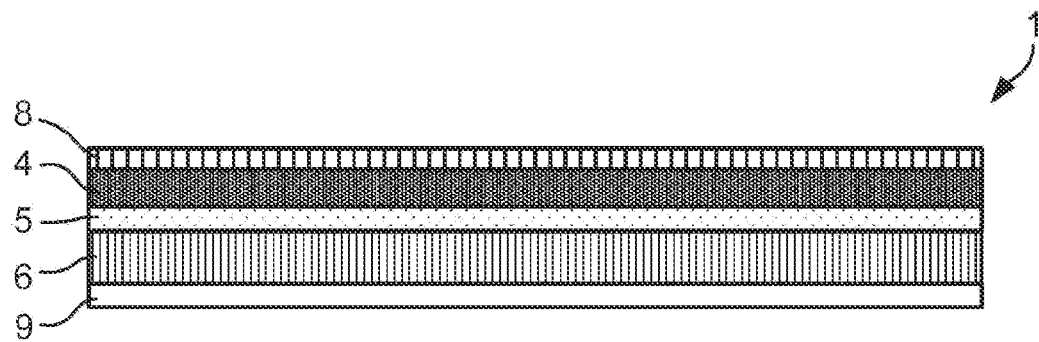

The decorative film shown in FIG. 1f corresponds to the decorative film 1 shown in FIG. 1b with the difference that the decorative film 1 further comprises an adhesive layer 9.

As shown in FIG. 1f, the adhesive layer 9 is arranged on the side of the color varnish layer 6 facing away from the transparent laser protective varnish layer 5.

However, it is also possible for the adhesive layer 9 to be arranged on the side of the color varnish layer 4 and/or the protective varnish layer 8 facing away from the transparent laser protective varnish layer.

It is thus possible for the adhesive layer 9 to form the layer or surface of the decorative film 1 pointing towards an observer and/or pointing away from an observer and/or to lie or be arranged above the color varnish layer 4, the color varnish layer 6 and/or the transparent laser protective varnish layer 5 in the observation direction and/or for the adhesive layer 9 to lie or be arranged underneath the color varnish layer 4, the color varnish layer 6 and/or the transparent laser protective varnish layer 5 in the observation direction.

The adhesive layer 9 preferably covers the color varnish layer 4 or the color varnish layer 6 in areas or completely in the case of an observation direction perpendicular to a plane spanned by the color varnish layer 4, the color varnish layer 6 and/or the transparent laser protective varnish layer 5.

This makes it possible for the decorative film 1 to be able to be applied to a plastic molded article, in particular firmly applied, in particular to be able to be applied such that the decorative film 1 is firmly joined to the plastic molded article.

By the term firmly joined is preferably meant here a durable join of two elements, with the result that they can no longer be separated mechanically without damaging at least one of the elements. Thus, for example, the decorative film 1 and a plastic molded article are firmly joined when there is a durable join between these two elements and the decorative film 1 and/or the plastic molded article cannot be separated without damaging one of the two elements.

The adhesive layer 9 expediently has a layer thickness of between 0.1 µm and 50 µm, preferably between 0.5 µm and 7 µm, further preferably between 2.5 µm and 3.0 µm. The adhesive layer 9 shown in FIG. 1f has for example a layer thickness of between 2.5 µm and 3.0 µm.

Preferably, the adhesive layer 9 is formed transparent and/or has, in particular in the wavelength range between 380 nm and 780 nm, a transmittance of at least 45%, preferably of at least 65%, further preferably of at least 95%. Thus, the adhesive layer 9 shown in FIG. 1f has for example a transmittance of at least 45%.

The adhesive layer 9 preferably consists of a material which is clearly transparent after application to the plastic molded article, in particular the adhesive layer 9 consists of a material which deflects light in the wavelength range between 380 nm and 780 nm by less than 8%, preferably by less than 4%, by scattering after application to the plastic molded article.

The adhesive layer 9 is preferably a layer of polymers and/or copolymers, in particular comprising PMMA, polyester, PU or PVC. It is further possible for the adhesive layer 9 to have acrylate as binder. For example, the adhesive layer 9 shown FIG. 1f has acrylate as binder.

It is also conceivable for the adhesive layer 9 to be dyed, in particular for the adhesive layer 9 to be dyed by means of dyes and/or pigments. The pigmentation level of the adhesive layer 9 is advantageously between 5% and 50%, preferably between 30% and 35%. For example, the adhesive layer 9 shown in FIG. 1f has a pigmentation level of between 30% and 35%.

However, it is also conceivable for the adhesive layer 9 to be colorless and/or to be clearly transparent and/or for the pigmentation level of the adhesive layer 9 to be 0%.

Figure 1G:
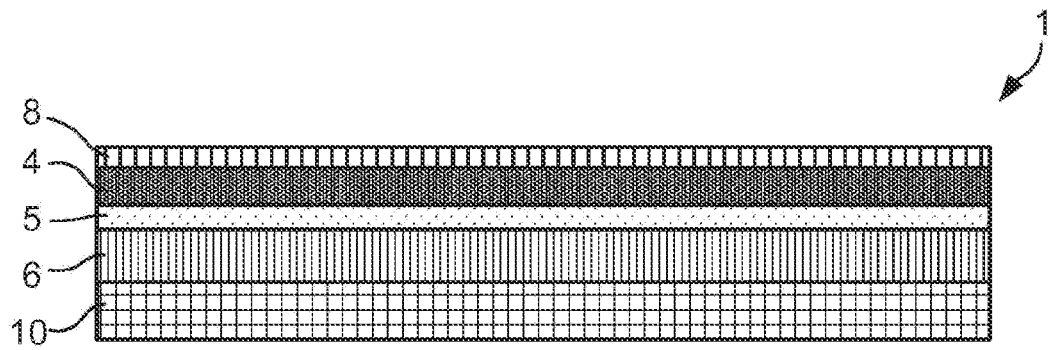

The decorative film 1 shown in FIG. 1g, in particular for decorating a plastic molded article, comprises a color varnish layer 4, a color varnish layer 6, a protective varnish layer 8, an electrical functional layer 10 with an electrical functional structure and a transparent laser protective varnish layer 5, wherein the transparent laser protective varnish layer 5 is arranged between the color varnish layer 4 and the color varnish layer 6. The decorative film 1 shown in FIG. 1g thus corresponds to the decorative film 1 shown in FIG. 1b with the difference that the decorative film 1 further has an electrical functional layer 10 with at least one electrical functional structure.

The electrical functional structure preferably forms a touch sensor panel, which provides a touch panel functionality.

By touch sensor panel is meant here in particular a touch-sensitive sensor which makes it possible to control an electrical functional element, for example a PDA or a control element, for example of a motor vehicle, identified by a symbol or writing. By a touch sensor panel is also meant in particular a multi-touch sensor panel which can process several simultaneous touches.

It is possible here for the at least one electrical functional structure to form a capacitive sensor panel.

However, it is also possible for the at least one electrical functional structure to form a resistive or inductive sensor panel.

It is further advantageous if the at least one electrical functional structure additionally has still further functional elements, such as for example electrical supply lines, electrical and/or electronic components, such as for example integrated circuits.

It is also conceivable for the at least one electrical functional structure to be formed single-ply or also multiply. It is further possible if the at least one electrical functional structure has a reinforcement layer at least in areas, which is applied for example by means of electroplating and/or by means of printing with metal pigment layers and/or other conductive layers such as for example carbon.

It is thus possible for the decorative film 1 to form a touch sensor and/or for the decorative film 1 to be a touch sensor.

It is further also advantageous if all layers arranged above the transparent laser protective varnish layer 5 in the observation direction are opaque, in particular if all layers arranged above the transparent laser protective varnish layer 5 in the observation direction have a transmittance of at most 50%, preferably of at most 5%, and/or if all layers arranged underneath the transparent laser protective varnish layer 5 in the observation direction are transparent, in particular if all layers arranged underneath the transparent laser protective varnish layer 5 have a transmittance of at least 25%, preferably of at least 45%.

Figure 2:
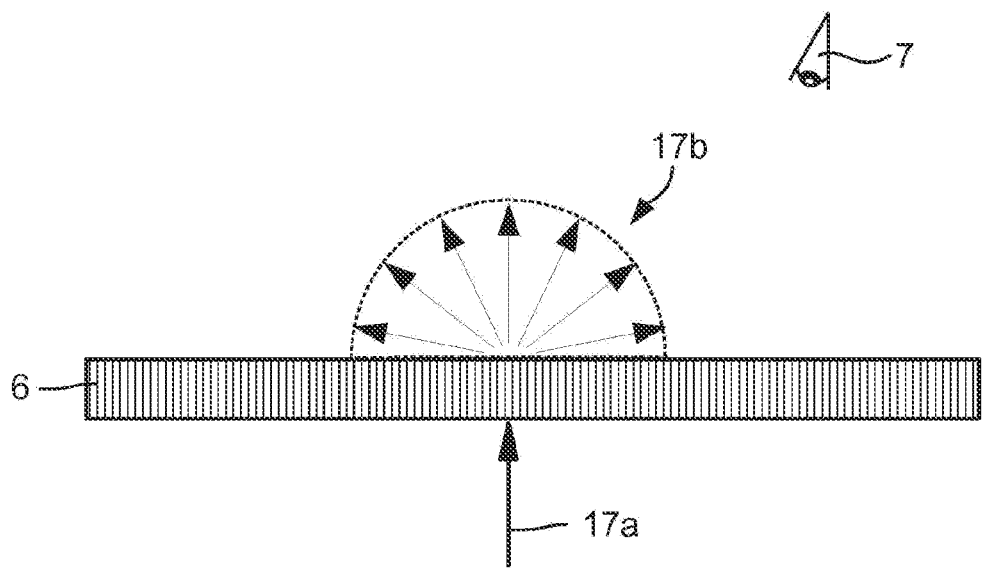

FIG. 2 schematically shows a diffusely scattering layer. The functional principle of a diffusely scattering layer is explained with reference to FIG. 2. The diffusely scattering layer can be for example the color varnish layer 6, which in particular scatters transmitted light diffusely, preferably in a large solid angle range, further preferably in all spatial directions, with the result that light, in particular of a point light source, is scattered homogeneously, with the result that the color varnish layer 6 appears to be homogeneously illuminated to an observer 7, in particular despite being illuminated with a point light source. It is thus possible for the color varnish layer 6 to form a diffuser film and/or for the color varnish layer 6 to be a diffuser film.

As shown in FIG. 2, incident light 17a is in particular transmitted and scattered through the color varnish layer 6. In particular, light in the wavelength range between 380 nm and 780 nm is preferably scattered diffusely by the color varnish layer 6, and/or the color varnish layer 6 preferably has a haze value of at least 50 haze units, preferably of at least 75 haze units.

It is also advantageous if the color varnish layer 6 scatters the transmitted light over a large angle range, in particular solid angle range. It is thus possible for the light 17b scattered by the color varnish layer 6 to be scattered over an angle range, in particular over a solid angle range, of at least 120°, preferably of at least 150°, still further preferably of at least 180°. In other words, it is possible for the color varnish layer 6 to scatter the transmitted light, in particular uniformly, spherically, preferably hemispherically, wherein identical areas of surface of the sphere, preferably of the hemisphere, preferably receive substantially the same light fraction of the scattered light.

As already set out above, it is also possible for the color varnish layer 6 to deflect more than 50%, preferably more than 75%, further preferably more than 85%, of the transmitted light, in particular from the wavelength range between 380 nm and 780 nm, by more than 2.5° from the direction of the incident light beam.

In particular due to the distribution of the scattered light 17b onto a large angle range, in particular solid angle range, the a diffusely scattering layer, such as the color varnish layer 6 here, appears to be homogeneously illuminated to the observer 7, although it is backlit for example by a point light source. Thus, due to a diffusely scattering layer, such as the color varnish layer 6 here, a uniformly illuminated surface area is preferably generated for an observer, even if, for example, several point light sources, such as for example LEDs, are arranged behind the diffusely scattering layer, such as the color varnish layer 6 here.

Figure 3:
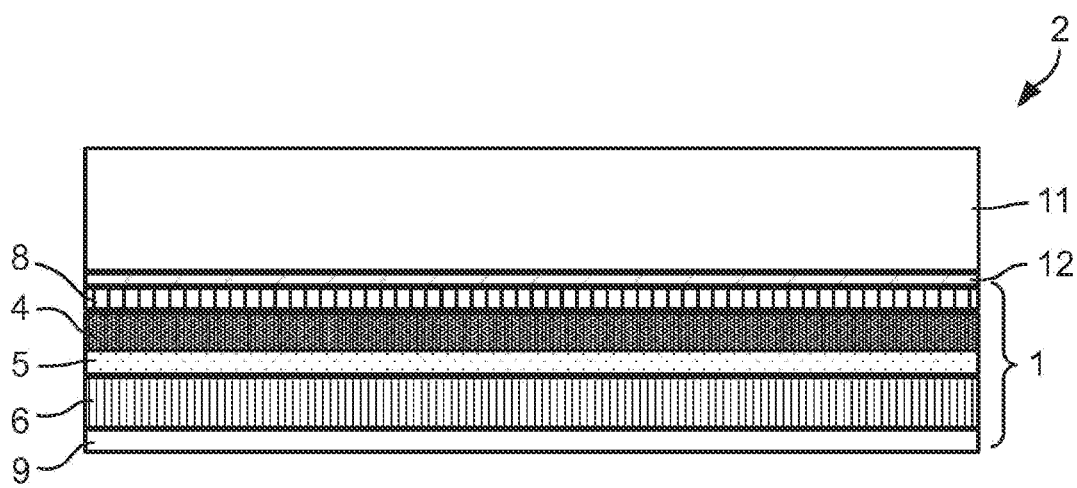

FIG. 3 schematically shows a sectional representation of a transfer film 2. The transfer film 2, in particular hot-stamping film and/or in-mold film, comprises a carrier film 11 and a decorative film 1 detachable from the carrier film 11. With respect to the design of the decorative film 1, reference is made here to the above statements.

As shown in FIG. 3, the transfer film 2 comprises a carrier film 11 and in particular a transfer ply detachable from the carrier film 11, wherein the decorative film 1 preferably forms the transfer ply of the transfer film 2 and wherein the transfer ply is arranged on the carrier film 11 and detachable from the carrier film.

Further, as can be seen from FIG. 3, the transfer film 2 advantageously further comprises a detachment layer 12, which is arranged, in particular, between the carrier film 11 and the detachable decorative film 1.

The detachment layer 12 preferably has a layer thickness of between 0.01 μm and 10 μm, preferably between 0.1 μm and 5 μm. The detachment layer 12 further consists in particular of waxes, polyethylene (PE), polypropylene (PP), cellulose derivatives and/or poly(organo)siloxanes.

Expediently, the carrier film 11 is a transparent carrier film, in particular made of PET, PMMA, PC, ABS or PU, and/or the carrier film 11 has a layer thickness of between 2 μm and 250 μm, preferably between 20 μm and 125 μm.

Such a transfer film 2 is in particular also used as a hot-stamping film and/or in-mold film, in particular as an in-mold decoration film, insert-molding film, in-mold labeling film and/or print mold design film.

It is thus possible for the transfer film 2 to be used as a hot-stamping film, wherein in particular the decorative film 1 is transferred to a target substrate, such as a plastic molded article, by means of a heated embossing die, which exerts pressure on the transfer film 2 during a specific period of time. The carrier film 11 is then preferably removed.

It is further also possible for the transfer film 2 to be used as an in-mold film, in particular as an in-mold decoration film, insert-molding film, in-mold labeling film and/or print mold design film, wherein in particular the transfer film 2 is placed in an injection mold and then, preferably after the injection mold has been closed, the transfer film 2 is back-injection molded with a plastic compound such that the decorative film firmly joins to the plastic compound. Here too, the carrier film 11 is then preferably removed.

FIG. 4a to FIG. 4d schematically show method steps for producing a transfer film 2.

Figure 4C:
Figure 4A:
Figure 4C:
Figure 4B:
Figure 4C:
Figure 4D:
Figure 4D:
Figure 4D:
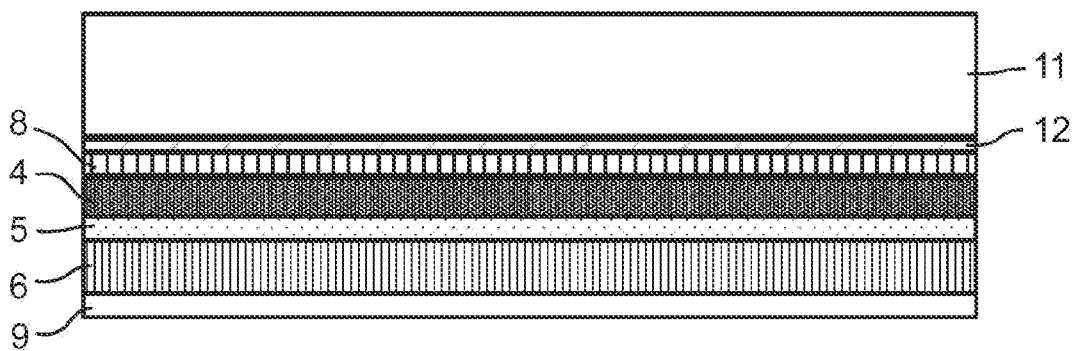

As shown in FIG. 4a, carrier film 11 is provided first. Then a detachment layer 12 is optionally applied to the carrier film 11. With respect to the design of the detachment layer 12, reference is made here to the above statements. The application of the detachment layer 12 is preferably effected by means of printing methods or by means of vapor deposition methods. As shown in FIG. 4b, the color varnish layer 4 is applied in a further step. With respect to the design of the color varnish layer 4, reference is made here to the above statements. The application of the color varnish layer 4 is preferably effected here by means of printing methods and/or metallization methods. With respect to possible printing methods and/or metallization methods, reference is also made here to the above statements. As shown in FIG. 4c, the transparent laser protective varnish layer 5 is applied in a further step, in particular by means of printing methods. Here too, with respect to the design of the transparent laser protective varnish layer 5 and possible printing methods, reference is again made to the above statements. As shown in FIG. 4d, the color varnish layer 6 is applied to the transparent laser protective varnish layer 5 in a further step. The application of the color varnish layer 6 is effected here in particular by means of printing methods, metallization methods and/or hot- or cold-transfer methods. Again, with respect to the printing, metallization and transfer methods, reference is also made to the above statements. An adhesive layer 9 is then optionally applied for example by means of printing methods in a further step. With respect to the design of the adhesive layer 9, reference is made here to the above statements. The optional protective varnish layer 8 shown in FIG. 4d can optionally additionally be applied, preferably by means of printing methods or casting methods, before the application of the first color varnish layer 4. Here too, with respect to the design of the protective varnish layer 8 and possible methods of application, reference is again made to the above statements. It is further expedient if the applied layers are pre-cured and/or cured thermally and/or by means of UV radiation.

The above-described method steps are preferably implemented in the above-named order.

In the method for producing a transfer film 2, the layers, in particular the color varnish layer 4, the transparent laser protective varnish layer 5 and/or the color varnish layer 6, are preferably applied to each other directly, i.e. preferably without further layers being arranged between the layers, in particular between the color varnish layer 4, the transparent laser protective varnish layer 5 and/or the color varnish layer 6, according to the above-described steps. It is thus possible for the decorative film 1 detachable from the carrier film 11 to comprise the color varnish layer 4, the color varnish layer 6 and the transparent laser protective varnish layer 5, wherein the transparent laser protective varnish layer 5 is arranged between the color varnish layer 4 and the color varnish layer 6.

Figure 5A:
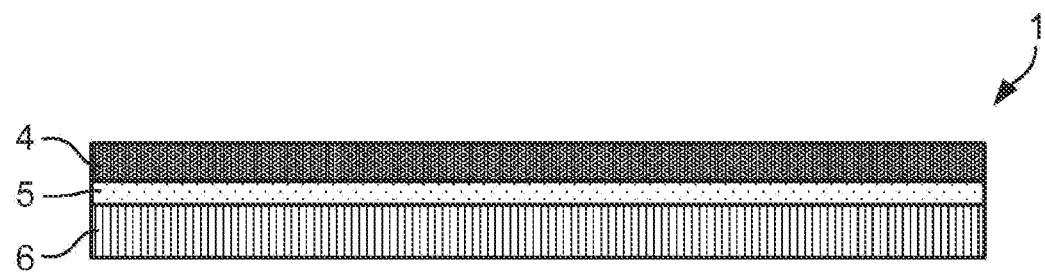
Figure 5B:
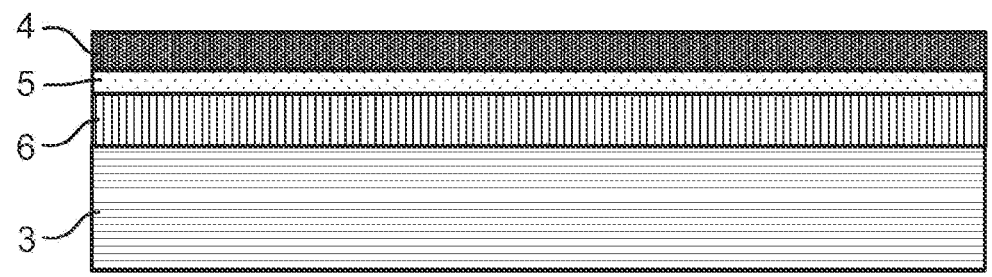
Figure 5C:
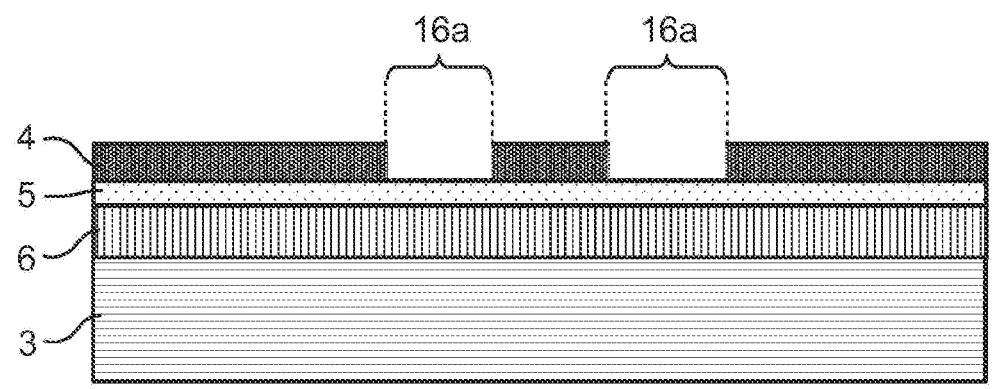

FIG. 5a to FIG. 5c schematically show method steps for decorating a plastic molded article 3.

As shown in FIG. 5a, a decorative film 1 is provided first, wherein the decorative film 1 comprises a color varnish layer 4, a color varnish layer 6 and a transparent laser protective varnish layer 5, and wherein the transparent laser protective varnish layer 5 is arranged between the color varnish layer 4 and the color varnish layer 6. With respect to further possible designs of the decorative film 1, reference is made here to the above statements. As shown in FIG. 5b, the decorative film 1 is applied to a plastic molded article 3 in a further step. The application of the decorative film is preferably effected here by means of hot- or cold-transfer methods, further preferably by means of hot stamping and/or in-mold methods. With respect to the possible methods of application, reference is made here to the above statements. The color varnish layer 4, in particular facing an observer, is removed in the areas 16a by means of a laser in a further step, which is shown in FIG. 5c.

By removal of a layer is meant here the partial and/or complete removal of a layer, in particular by means of laser cutting and/or laser ablation. If, for example, a layer is removed in an area, the corresponding layer in this area has been partially and/or completely removed. The removal is preferably effected here on the basis of laser cutting and/or laser ablation. By removal is also meant the partial and/or complete removal of a layer, in particular by means of mechanical or precision methods, for example by means of milling and/or grinding and/or drilling.

As shown in FIG. 5c, the decorative film 1 is preferably applied to the plastic molded article 3 in step b) such that the color varnish layer 4 forms the side facing the observer 7 and the color varnish layer 6 forms the side facing away from the observer.

The above method steps are advantageously carried out in the above-stated order.

The areas 16a advantageously form decorative elements, such as for example symbols or writing. It is also possible if areas 16a represent a logo and/or a symbol and/or a pattern and/or an alphanumeric character.

It is further also preferred if the areas 16a, when viewed perpendicular to the decorative film 1 and/or the plastic molded article 3, have a line width of at least 50 μm, preferably of at least 100 μm, and/or if the areas 16a, when viewed perpendicular to the decorative film 1 and/or the plastic molded article 3, have a line width of at most 2 mm, preferably of at most 1 mm, further preferably of at most 0.5 mm.

As further shown in FIG. 5c, it is advantageous if the color varnish layer 4 is removed in the areas 16a by means of the laser in step c) such that the transparent laser protective varnish layer 5 is uncovered. It is thus possible for the color varnish layer 4 to be completely removed in the areas 16a in step c).

It is further preferred if the color varnish layer 4 is removed in the areas 16a by means of a laser in step c) such that the layer thickness of the transparent laser protective varnish layer 5 in the areas 16a in which the color varnish layer 4 has been removed by means of the laser substantially corresponds to the layer thickness of the transparent laser protective varnish layer 5 in those areas in which the color varnish layer 4 has not been removed by means of the laser.

In particular, a possible slight superficial damage of the transparent laser protective varnish layer 5 is acceptable here, preferably as long as the total thickness of the transparent laser protective varnish layer 5 is reduced by no more than 50%, preferably by no more than 30%.

It is further also possible for the transparent laser protective varnish layer 5 to be designed such that the layer thickness of the transparent laser protective varnish layer 5 in the areas 16a in which the color varnish layer 4 is removed by means of a laser is reduced by less than 25%, preferably by less than 15%, further preferably by less than 5%, compared with those areas in which the color varnish layer 4 is not removed by means of the laser.

In particular, it is hereby ensured in the end product on the one hand that the transparent laser protective varnish layer 5 performs its function of protection from environmental influences for the layers lying underneath and on the other hand that the transparent laser protective varnish layer 5 also performs, or has also performed, its function as a spacer or buffer layer.

It is further possible for the decorative film 1 to be applied by means of transfer methods in step b), in particular hot- and/or cold-transfer methods, such as for example hot stamping, in-mold decoration, insert molding, print mold design, in-mold labeling, laminating and/or bonding.

Furthermore, it is also possible for the decorative film 1 to be applied to the plastic molded article 3 by means of back-injection molding in step b). It makes sense here if the method further comprises the following steps:
    placing the decorative film 1 in an injection mold
    back-injection molding the decorative film 1 with a plastic compound such that the decorative film 1 firmly joins to the plastic compound and in particular that the decorative film 1 forms a first surface of the plastic molded article 3. The cured plastic compound here preferably forms the plastic molded article 3.

Figure 6A:
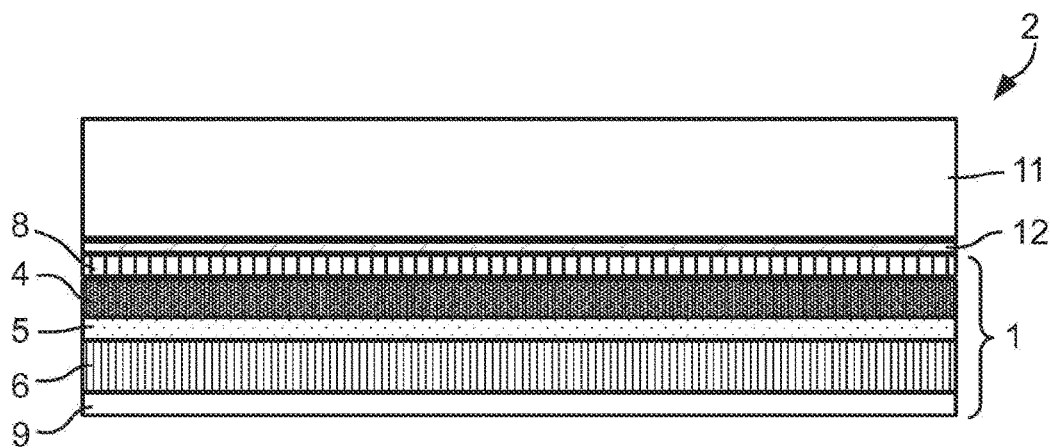
Figure 6B:
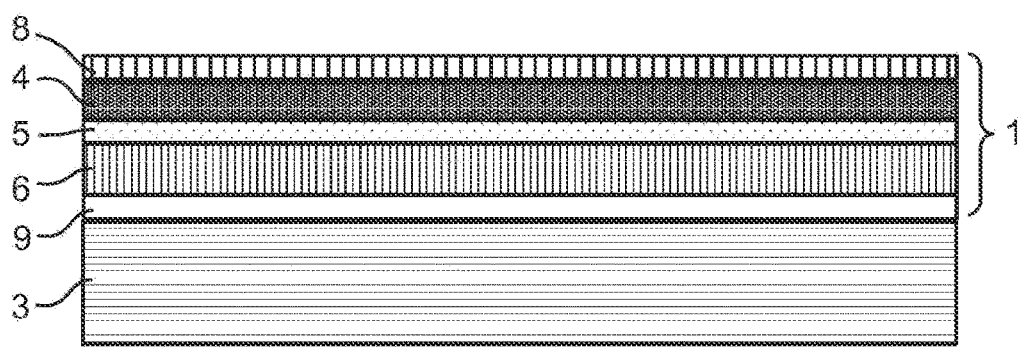
Figure 6C:
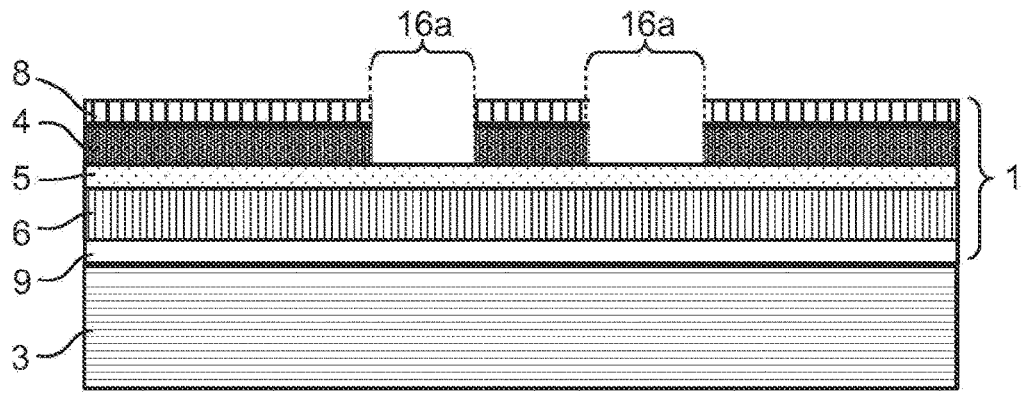

FIG. 6a to FIG. 6c schematically show method steps for decorating a plastic molded article 3.

As shown in FIG. 6a, a transfer film 2 comprising a decorative film 1 is provided first, wherein the decorative film 1 comprises a protective varnish layer 8, a color varnish layer 4, a transparent laser protective varnish layer 5, a color varnish layer 6 and an adhesive layer 9 and wherein the transparent laser protective varnish layer 5 is arranged between the color varnish layer 4 and the color varnish layer 6. With respect to the further design of the transfer film 2 and of the decorative film 1, reference is made here to the above statements. In a further step shown in FIG. 6b, the decorative film 1 is applied to the plastic molded article 3. To apply the decorative film 1, transfer methods, in particular hot- and/or cold-transfer methods, such as for example hot stamping, in-mold decoration, insert molding, print mold design, in-mold labeling, laminating and/or bonding, are preferably used. In a step shown in FIG. 6c, at least the color varnish layer 4 is then removed in the areas 16a by means of a laser. As shown in FIG. 6c, the color varnish layer 4 is arranged, in particular, on the side of the plastic molded article 3 facing the observer.

Further, as shown in FIG. 6c, the protective varnish layer 8, in particular arranged above the at least one first color varnish layer 4 in the observation direction, is further also at least partially removed, in particular completely removed, in the areas 16a.

By partially removed is preferably meant here that the partially removed layer is altered or destroyed such that it no longer satisfies its predetermined properties. Thus, for example, a partially removed protective varnish layer 8 no longer satisfies its predetermined property of protecting layer arranged underneath from chemical, physical and/or mechanical environmental influences.

By completely removed is preferably meant here that the completely removed layers are stripped off and/or ablated and/or burnt up and/or evaporated residue-free in the corresponding areas. Thus, if for example the color varnish layer 4 is completely removed in the areas 16a, in particular by means of laser cutting and/or laser ablation, then the color varnish layer 4 is stripped off residue-free in the areas 16a.

It is thus possible for the protective varnish layer 8, in particular arranged above the at least one first color varnish layer 4 in the observation direction, to be at least partially removed in the areas 16a such that layers arranged underneath the protective varnish layer 8, in particular the transparent laser protective varnish layer 5 and/or the color varnish layer 6, are no longer protected chemical, physical and/or mechanical environmental influences in the areas 16a. In other words, in this case the transparent laser protective varnish layer 5 and/or the color varnish layer 6 are exposed to the chemical, mechanical and/or physical environmental influences, with the result that the transparent laser protective varnish layer 5 now performs the function of protecting the layer arranged underneath it.

Furthermore, it is also possible if all layers arranged above the transparent laser protective varnish layer 5 in the observation direction are removed, in particular completely removed, in the areas 16a in step c).

It is further possible for an electrical functional layer with an electrical functional structure further to be arranged, in particular, on the side of the color varnish layer 6 facing away from the observer, wherein the electrical functional structure preferably forms a touch sensor panel, which provides a touch panel functionality. The electrical functional layer with the electrical functional structure is preferably arranged between the decorative film 1 and the plastic molded article 3. It is thus possible for the electrical functional layer to be arranged on the side of the color varnish layer 6 facing away from the transparent laser protective varnish layer 5.

It is advantageous here if the electrical functional layer with the electrical functional structure are firmly joined to the decorative film 1 and the plastic molded article 3.

Furthermore, it is also possible for a backlighting device, in particular comprising organic light-emitting diodes (OLEDs), inorganic light-emitting diodes (LEDs), micro-LEDs (mLEDs) and/or quantum-dot light-emitting diodes (QLEDs), further to be arranged preferably on the side of the plastic molded article 3 facing away from the decorative film 1. The backlighting device is expediently firmly attached, in particular bonded or laminated.

As an alternative or supplement, the backlighting device can also comprise incandescent lamps, halogen lamps, gas-discharge lamps and/or fluorescent lamps, in particular induction lamps.

Less preferably, the backlighting device comprises lasers and/or chemico-physical illuminants, such as for example luminous paints or glow sticks.

It is further possible for further steps, in particular for further processing the plastic molded article 3, to be carried out in particular after the above-mentioned steps for decorating a plastic molded article 3. It thus possible, for example, for the plastic molded article 3, in particular the plastic molded article 3 decorated with the decorative film 1, to be further processed with one of the further steps selected from: varnishing with further layers, PU flooding, overspraying or overlaying with a further plastic component, milling, punching, deep-drawing, polishing and/or stamping.

Figure 7:
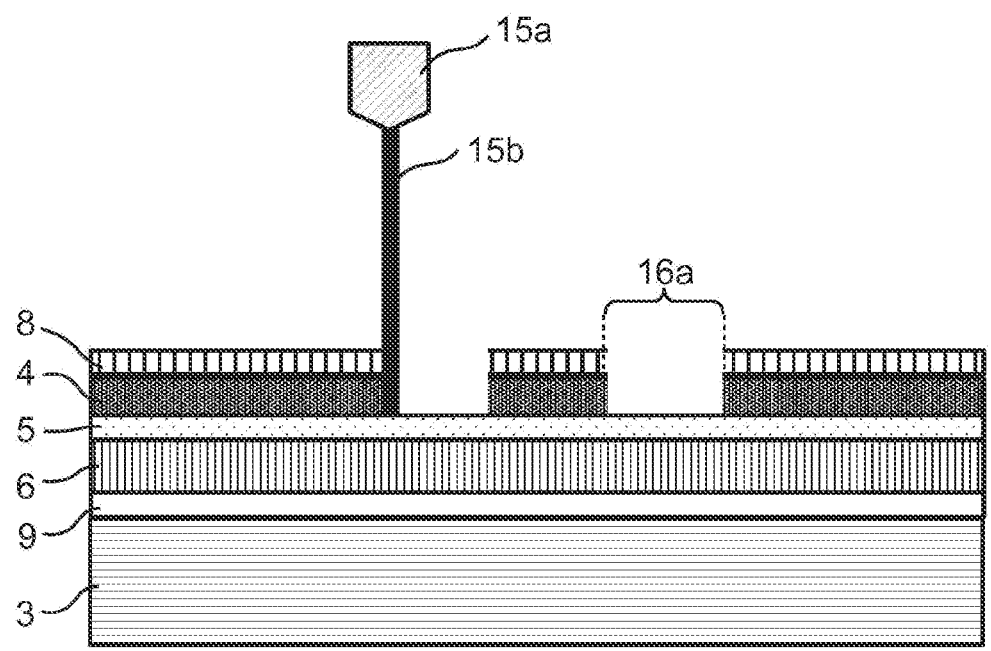

FIG. 7 schematically shows a method step which is implemented during the method for decorating a plastic molded article 3. The method step shown in FIG. 7 is a detail view of the above-named step of removing at least the color varnish layer 4 in the areas 16a by means of a laser 15a.

As shown in FIG. 7, at least the color varnish layer 4 is removed by means of a laser 15a. Further, the protective varnish layer 8, in particular arranged on the color varnish layer 4 and forming the surface of the plastic molded article 3, as set out above, is also at least partially removed.

A laser 15a with a beam diameter at the focal point of at least 50 µm, preferably at least 100 µm, is preferably used here.

It is also possible to focus the laser beam 15b by means of one or more lenses, in particular with a focal length of between 100 mm and 500 mm, preferably between 200 mm and 300 mm, further preferably of 254 mm.

It is further preferred if a laser 15a, in particular a fiber laser, is used, wherein the laser 15a emits coherent light from the infrared range, preferably the near-infrared range, further preferably light from the wavelength range between 780 nm and 1400 nm, still further preferably light with a wavelength of 1064 nm.

The laser power is preferably between 0.05 W and 100 W, preferably between 1 W and 20 W, further preferably between 5 W and 10 W.

It is expedient if the laser beam 15b is deflected by means of movable mirrors, in particular by means of a laser scanning module, along the areas 16a.

According to a further embodiment example of the invention the laser 15a is operated at a writing speed of at most 3000 mm/s, preferably at a writing speed of between 500 mm/s and 2500 mm/s, and/or the laser 15a is operated at a pulse frequency of between 1 Hz and 1000 kHz, preferably between 1 kHz and 200 kHz.

However, it is further also possible for the laser 15a to be operated continuously. However, a pulsed laser is preferably used, as in this case in particular the thermal load of the plastic molded article 3 is reduced compared with a continuously operated laser.

The parameters of the laser 15a are chosen here in particular depending both on the layers 4, 8 to be removed and on the layers 5, 6, 9, 3 not to be removed. In particular, the parameters are chosen depending on the layer thicknesses and the material of the layers 4, 8 to be removed and/or of the layers 5, 6, 9, 3 not to be removed. Thus, the parameters of the laser 15a are also influenced by the material of the plastic molded article 3, as the latter is exposed in particular to the heat generated by the laser 15a or laser beam 15b. In order in particular to prevent a deformation of the plastic molded article 3, the material of the plastic molded article 3 is therefore also to be taken into account in the choice of the laser parameters. Further, in particular, the penetration depth of the laser 15a or of the laser beam 15b is influenced by the parameters writing speed, pulse frequency and laser power. Further, the laser parameters are advantageously also chosen depending on the design of areas 16a to be removed. Here, the layout, the layout size, the line width and filling effects are to be named in particular. These include, for example, among others, the number and laser direction of fillings, repetitions of outlines and fillings and the sequence of the individual constituents of the layout.

Examples of laser parameters for a plastic molded article 3 made of transparent ABS decorated with a decorative film 1 which is processed according to the above methods are given below:

laser power: 8 W
laser frequency: 50 kHz
writing speed: 2000 mm/s
wavelength: 1064 nm FIG. 8*a* to FIG. 8*e* schematically show sectional representations of a plastic molded article 3.

Figure 8A:
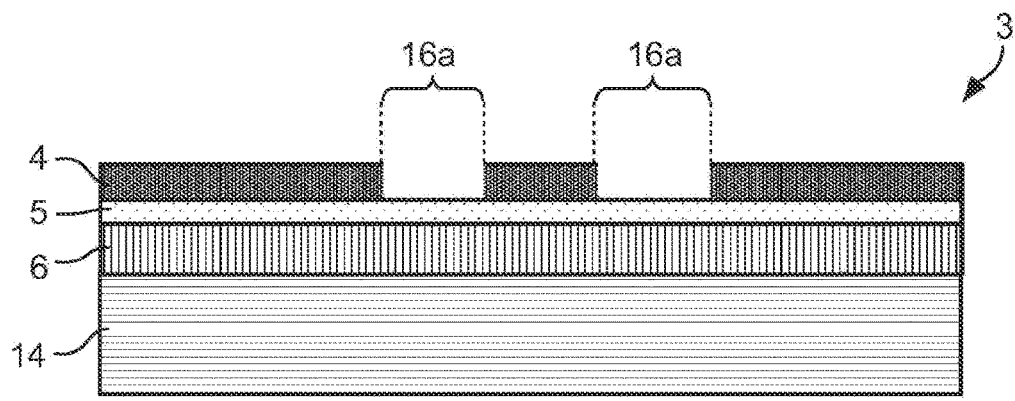

The plastic molded article 3 shown in FIG. 8*a* comprises a decorative film 1. The decorative film 1 here comprises the color varnish layer 4, the color varnish layer 6 and the transparent laser protective varnish layer 5, wherein the transparent laser protective varnish layer 5 is arranged between the color varnish layer 4 and the color varnish layer 6. Further, the color varnish layer 4, in particular facing an observer, is removed in the areas 16*a* by means of a laser. With respect to the design of the layers 4, 5 and 6, reference is made here to the above statements.

It is further advantageous if the plastic molded article, as shown in FIG. 8*a*, has a layer of a thermoplastic material 14, which is in particular arranged on the side of the color varnish layer 6 facing away from the observer. It is thus possible for the at least one layer of a thermoplastic material 14 to be arranged on the color varnish layer 6 facing away from the observer.

The areas 16*a*, when viewed perpendicular to the decorative film 1, preferably have a line width of at least 50 μm, preferably of at least 100 μm. However, it is also possible for the areas 16*a*, when viewed perpendicular to the decorative film 1, to have a line width of at most 2 mm, preferably of at most 1 mm, further preferably of at most 0.5 mm.

With respect to the further design of the areas 16*a*, reference is made here to the above statements.

It is further possible for the plastic molded article 3 to have a layer thickness of between 0.5 mm and 10 mm, preferably between 0.8 mm and 5 mm.

The layer of a thermoplastic material 14 is preferably transparent, in particular the layer of a thermoplastic material 14 has a transparency of between 5% and 98%, in particular in the wavelength range between 380 nm and 780 nm.

The layer of a thermoplastic material 14 is preferably formed from one of the following materials: ABS, PC, ABS/PC, PC/ABS, PMMA, polypropylene (PP), PA, thermoplastic polyurethane (TPU).

It is further conceivable for the layer of a thermoplastic material 14 to be dyed, in particular for the layer of a thermoplastic material 14 to be dyed by means of dyes and/or pigments. Preferably, the pigmentation level of the layer of a thermoplastic material 14 is less than 15%, preferably less than 10%, further preferably less than 5%.

Figure 8B:
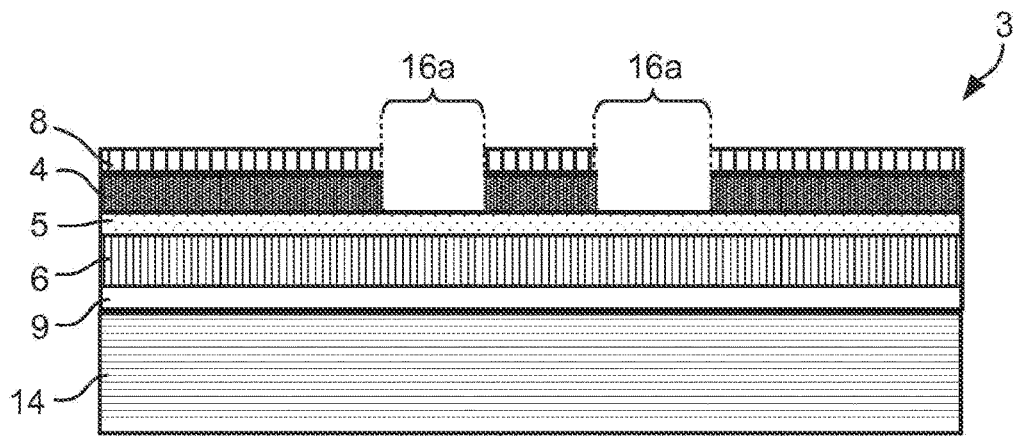

The plastic molded article 3 shown in FIG. 8*b* corresponds to the plastic molded article 3 shown in FIG. 8*a* with the difference that the plastic molded article 3, in particular the decorative film 1 comprised by the plastic molded article 3, further comprises the protective varnish layer 8 and the adhesive layer 9, wherein the protective varnish layer 8 is at least partially removed in the areas 16*a*, as set out above. With respect to the design of the protective varnish layer 8 and of the adhesive layer 9, reference is made here to the above statements.

Figure 8C:
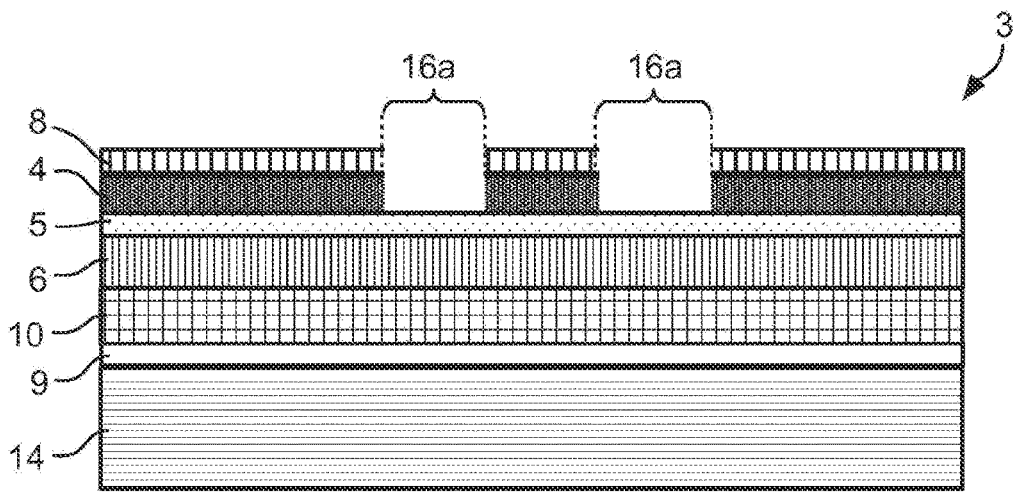

The plastic molded article 3 shown in FIG. 8*c* corresponds to the plastic molded article 3 shown in FIG. 8*b* with the difference that the plastic molded article 3, in particular the decorative film 1 comprised by the plastic molded article 3, further has the electrical functional layer 10 with an electrical functional structure, in particular on the color varnish layer 6 facing away from an observer, wherein the functional structure preferably forms a touch sensor panel, which provides a touch panel functionality.

As shown in FIG. 8*c*, the functional layer 10 with the electrical functional structure is arranged between the decorative film 1 and the layer of thermoplastic material 14. Thus, the functional layer 10 is preferably arranged on the side of the color varnish layer 6 facing away from the transparent laser protective varnish layer 5.

With respect to further possible designs of the electrical functional layer 10 with the electrical functional structure, reference is made here to the above statements.

Thus, the plastic molded article 3 shown in FIG. 8*c*, in particular the plastic molded article 3 decorated with the decorative film 1, forms for example a touch sensor.

Figure 8D:
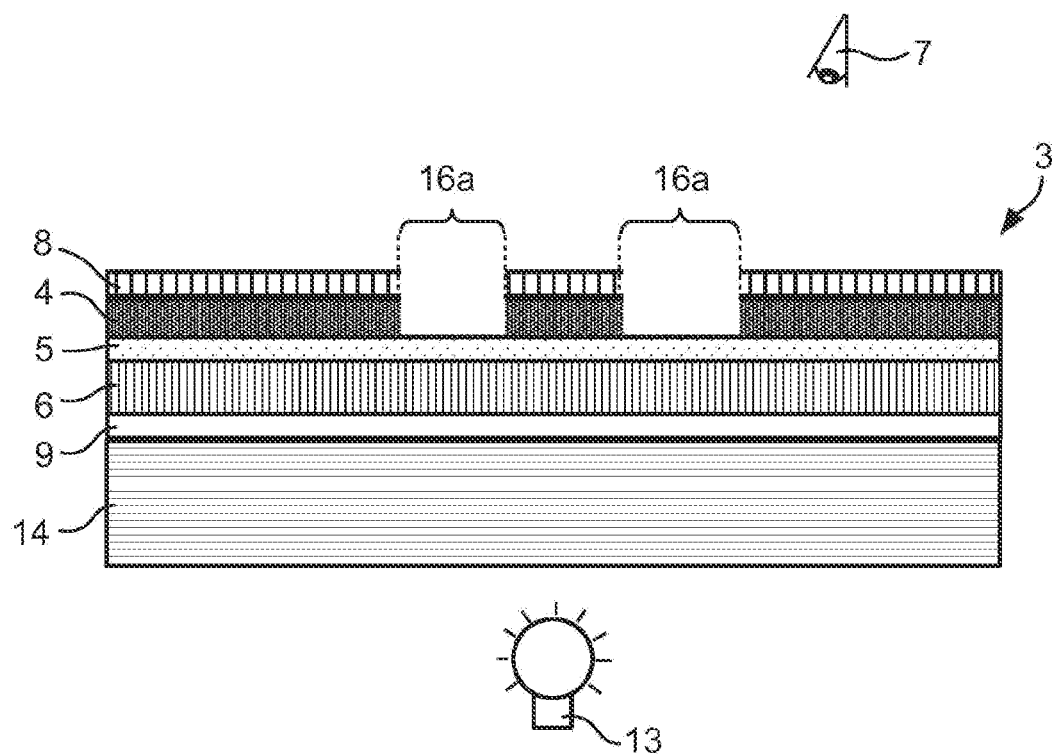

The plastic molded article 3 shown in FIG. 8*d* likewise corresponds to the plastic molded article shown in FIG. 8*b* with the difference that the plastic molded article 3 further has a backlighting device 13, in particular comprising organic light-emitting diodes (OLEDs), inorganic light-emitting diodes (LEDs), micro-LEDs (mLEDs) and/or quantum-dot light-emitting diodes (QLEDs), wherein the backlighting device 13 is preferably arranged on the side of the layer of thermoplastic material 14 facing away from the decorative film 1.

With respect to further possible designs of the backlighting device 13, reference is made here to the above statements.

Figure 8E:
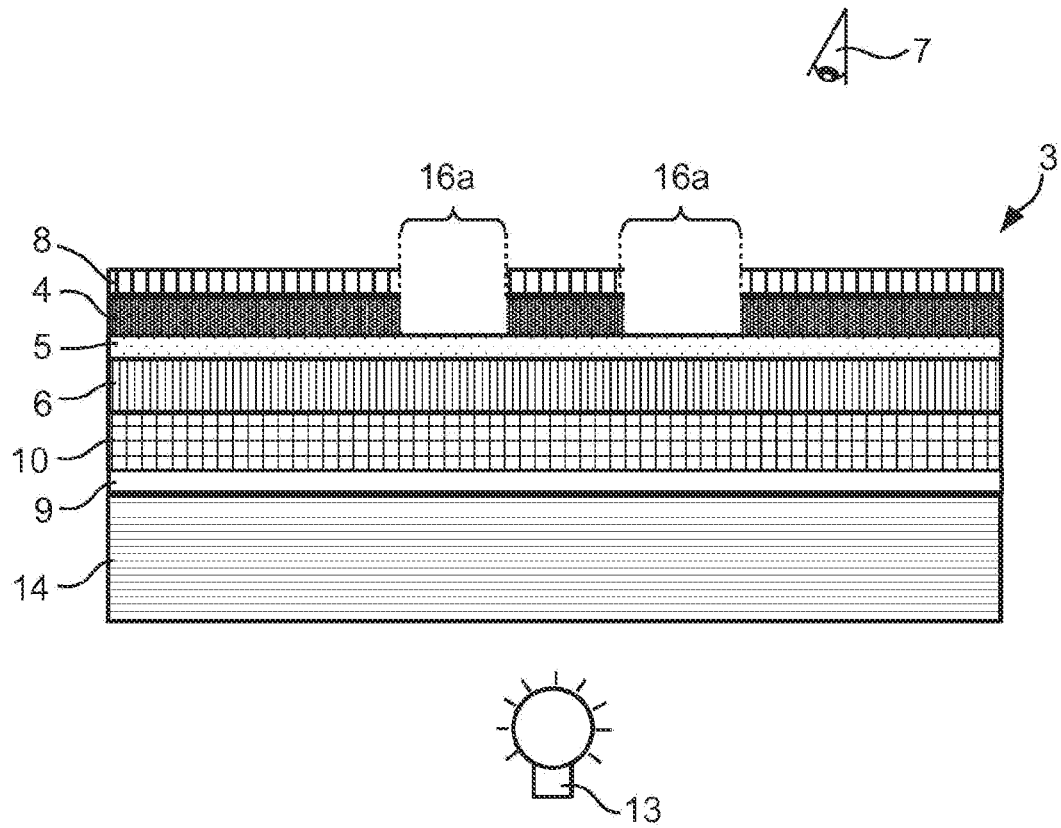

The plastic molded article 3 shown in FIG. 8*e* corresponds to the plastic molded article shown in FIG. 8*c* with the difference that the plastic molded article 3 further has, like the plastic molded article 3 shown in FIG. 8*d*, a backlighting device 13, wherein the backlighting device 13 is preferably arranged on the side of the layer of thermoplastic material 14 facing away from the decorative film 1.

Here too, with respect to possible designs of the backlighting device 13 and/or of the electrical functional layer 10 with the electrical functional structure, reference is made to the above statements.

Figure 9:
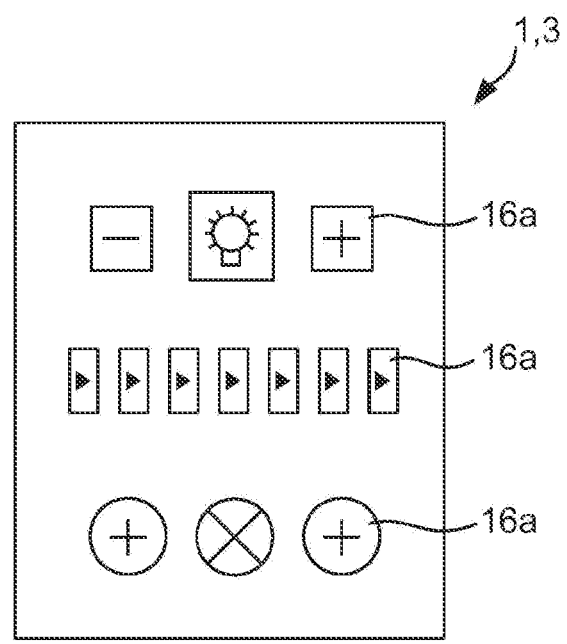

FIG. 9 schematically shows a top view of a decorative film 1 and/or of a plastic molded article 3 which comprises a decorative film 1. As shown in FIG. 9, the decorative film 1 and/or the plastic molded article 3 comprising the decorative film 1 has areas 16*a* in which at least the color varnish layer 4, 4*a*, 4*b* has been removed by means of a laser. The areas 16*a* form, as shown in FIG. 9, decorative elements, such as for example symbols or writing. Thus, the areas 16*a* form for example, as shown in FIG. 9, symbols. However, it is also possible for the areas to represent patterns and/or logos and/or alphanumeric characters.

Firstly, FIG. 9 represents the top view of a decorative film 1 in which the color varnish layer 4, 4*a*, 4*b*, in particular facing an observer, is removed, in particular completely removed, in the areas 16*a*, with the result that the transparent laser protective varnish layer 5 is uncovered in particular in the areas 16*a*. FIG. 9 further also presents the top view of a plastic molded article 3 which comprises a decorative film 1, which is likewise, as set out above, applied to the plastic molded article and is designed corresponding to the above statements. Thus, FIG. 9 can be both the top view of a decorative film 1 and the top view of a plastic molded article 3 decorated with a decorative film 1.

With respect to the further design of the areas 16a and/or of the decorative film 1 and/or of the plastic molded article 3, in particular with respect to possible layer structures of the decorative film 1 and/or of the plastic molded article 3, reference is made here to the above statements.

LIST OF REFERENCE NUMBERS 1 decorative film
2 transfer film
3 plastic molded article
4, 4a, 4b first color varnish layer(s)
5 transparent laser protective varnish layer
6, 6a, 6b second color varnish layer(s)
7 observer
8 protective varnish layer
9 adhesive layer
10 electrical functional layer
11 carrier film
12 detachment layer
13 backlighting means
14 layer of thermoplastic material
15a, 15b laser, laser beam
16a, 16b, 16c areas
17a, 17b incident light, scattered light

The invention claimed is:

1. A decorative film for decorating a plastic molded article comprising at least one first color varnish layer, at least one second color varnish layer and a transparent laser protective varnish layer, wherein the at least one first color varnish layer is disposed on an observer side of the transparent laser protective varnish layer and the at least one second color varnish layer is disposed on a side of the transparent laser protective varnish layer opposite the observer side such that the transparent laser protective varnish layer is arranged between the at least one first color varnish layer and the at least one second color varnish layer, and
wherein the decorative film has one or more electrical functional layers with at least one electrical functional structure disposed on the side of the transparent laser protective varnish layer opposite the observer side, wherein the at least one electrical functional structure forms a touch sensor panel, which provides a touch panel functionality, and
wherein the at least one second color varnish layer has a transmittance of at least 10%, and
wherein the at least one second color varnish layer deflects more than 50% of the transmitted light by more than 2.5° from a direction of an incident light beam, and
wherein the at least one first color varnish layer is at least partially removed in one or more first areas such that the transparent laser protective varnish layer is uncovered on the observer side, and
wherein the decorative film further comprises a protective varnish layer disposed on the observer side of the transparent laser protective varnish layer such that the at least one first color varnish layer is arranged between the transparent laser protective varnish layer and the protective varnish layer, and
wherein the protective varnish layer is at least partially removed in the one or more first areas.

2. The decorative film according to claim 1, wherein the transparent laser protective varnish layer is a layer of monomers, oligomers, polymers or copolymers, or wherein the transparent laser protective varnish layer has polyacrylate as binder.

3. The decorative film according to claim 1, wherein the transparent laser protective varnish layer has polyetherimides and/or polysulfones.

4. The decorative film according to claim 1, wherein the transparent laser protective varnish layer protects the at least one second color varnish layer from mechanical, physical and/or chemical environmental influences.

5. The decorative film according to claim 1, wherein the at least one first color varnish layer is formed opaque or wherein the at least one first color varnish layer has a transmittance of at most 50%.

6. The decorative film according to claim 1, wherein the at least one first color varnish layer is multi-layered.

7. The decorative film according to claim 1, wherein the at least one second color varnish layer is formed transparent.

8. The decorative film according to claim 1, wherein the at least one second color varnish layer is multi-layered.

9. The decorative film according to claim 1, wherein the at least one second color varnish layer scatters, light diffusely, or wherein the at least one second color varnish layer has a haze value of at least 50 haze units.

10. The decorative film according to claim 1, wherein the at least one second color varnish layer comprises a metal.

11. The decorative film according to claim 10, wherein the at least one second color varnish layer has a layer thickness between 1 nm and 500 nm, and wherein the metal of the at least one second varnish layer is at least one of aluminum, cobalt, copper, gold, iron, chromium, nickel, silver, platinum, palladium, titanium or alloys thereof, such that the at least one second varnish layer has a transmittance of more than 10%.

12. The decorative film according to claim 1, wherein the protective varnish layer is clear.

13. The decorative film according to claim 1, wherein the at least one electrical functional structure forms a capacitive sensor panel.

14. The decorative film according to claim 1, wherein all layers arranged above the transparent laser protective varnish layer in the observation direction are opaque, and/or wherein all layers arranged underneath the transparent or translucent laser protective varnish layer in the observation direction are transparent.

* * * * *